US012723122B2

(12) United States Patent
Shibutani et al.

(10) Patent No.: US 12,723,122 B2
(45) Date of Patent: Sep. 1, 2026

(54) CURABLE COMPOSITION

(71) Applicant: DAIKIN INDUSTRIES, LTD., Osaka (JP)

(72) Inventors: Shouta Shibutani, Osaka (JP); Shingo Okuno, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 700 days.

(21) Appl. No.: 18/176,856

(22) Filed: Mar. 1, 2023

(65) Prior Publication Data

US 2023/0203228 A1 Jun. 29, 2023

Related U.S. Application Data

(63) Continuation of application No. PCT/JP2021/032341, filed on Sep. 2, 2021.

(30) Foreign Application Priority Data

Sep. 3, 2020 (JP) ................................ 2020-148431

(51) Int. Cl.
*C08F 293/00* (2006.01)

(52) U.S. Cl.
CPC ...... *C08F 293/005* (2013.01); *C08F 2438/03* (2013.01)

(58) Field of Classification Search
CPC .......... C08L 71/00; C08L 83/10; C08L 63/00; C08F 293/005; C08F 2438/03; C09D 135/02; C09D 163/00
See application file for complete search history.

(56) References Cited

U.S. PATENT DOCUMENTS 6,183,872 B1 2/2001 Tanaka et al.
2009/0156705 A1 6/2009 Yoneyama et al.
2011/0306429 A1* 12/2011 Mikami ................ F16C 33/104 464/7
2012/0123049 A1 5/2012 Koshikawa et al.
2015/0119523 A1 4/2015 Ameduri et al.
2016/0245233 A1* 8/2016 Gajiwala ................ B32B 25/20
2016/0289488 A1 10/2016 Yoshida et al.
2019/0055382 A1* 2/2019 Kitaichi .................. C08L 27/16
2020/0041695 A1 2/2020 Chen et al.
2022/0195115 A1* 6/2022 Shibutani ............. C09D 171/00

FOREIGN PATENT DOCUMENTS

CN 104540861 A 4/2015
CN 110437660 A 11/2019
JP 2007-106785 A 4/2007
JP 2009-143048 A 7/2009
KR 10-2015-0064177 A 6/2015
TW 201235432 A1 9/2012
WO 97/007155 A1 2/1997
WO WO-2021045209 A1 * 3/2021 ........... C09D 153/00

OTHER PUBLICATIONS

International Preliminary Report on Patentability mailed Mar. 16, 2023 with a Translation of the Written Opinion of the International Searching Authority in Application No. PCT/JP2021/032341.
Extended European Search Report dated Sep. 23, 2024 in Application No. 21864414.4.
International Search Report for PCT/JP2021/032341 dated Nov. 9, 2021.

* cited by examiner

*Primary Examiner* — Mark S Kaucher
(74) *Attorney, Agent, or Firm* — Sughrue Mion, PLLC

(57) ABSTRACT

A curable composition including a silicone copolymer, a fluoropolyether group-containing compound, and a matrix-forming composition, wherein the silicone copolymer has two or more crosslinkable groups; and the crosslinkable group is a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group, or a precursor group thereof. Also disclosed is a film formed from the curable composition, and an article including a substrate and a layer on a surface of the substrate formed from the curable composition.

45 Claims, No Drawings

CURABLE COMPOSITION

CROSS REFERENCE TO RELATED APPLICATIONS

This application is a Rule 53(b) Continuation of International Application No. PCT/JP2021/032341 filed Sep. 2, 2021, claiming priority based on Japanese Patent Application No. 2020-148431 filed Sep. 3, 2020, the respective disclosures of which are incorporated herein by reference in their entirety.

TECHNICAL FIELD

The present disclosure relates to a curable composition.

BACKGROUND ART

Certain types of silicone compounds are known to be capable of providing excellent functions such as antifouling property, when used in surface treatment of a substrate (Patent Literature 1). In addition, certain types of fluorine-containing compounds are also known to be capable of providing excellent functions such as water-repellency and oil-repellency, when used in surface treatment of a substrate (Patent Literature 2).

CITATION LIST

Patent Literature

Patent Literature 1: JP 2009-143048 A
Patent Literature 2: International Publication No. WO 97/07155

SUMMARY

[1] A curable composition comprising a silicone copolymer, a fluoropolyether group-containing compound, and a matrix-forming composition, wherein the silicone copolymer has two or more crosslinkable groups; and the crosslinkable group is a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group, or a precursor group thereof.

Advantageous Effect

The curable composition of the present disclosure can form a layer that has excellent water-repellency and surface lubricity and that is unlikely to cause bleedout.

DESCRIPTION OF EMBODIMENTS

The term "organic group", as used herein, refers to a monovalent group containing carbon. The organic group may be a hydrocarbon group or a derivative thereof, unless otherwise specified. The derivative of a hydrocarbon group refers to a group that has one or more of N, O, S, Si, amide, sulfonyl, siloxane, carbonyl, carbonyloxy, and the like at the terminal or in the molecular chain of the hydrocarbon group. The simple term "organic group" refers to a monovalent organic group. The term "divalent organic group" refers to a divalent group containing carbon. Examples of such a divalent organic group include, but are not limited to, a divalent group obtained by further removing one hydrogen atom from an organic group.

The term "hydrocarbon group", as used herein, refers to a group that contains carbon and hydrogen and that is obtained by removing one hydrogen atom from a hydrocarbon. Examples of such a hydrocarbon group include, but are not limited to, a $C_{1-20}$ hydrocarbon group optionally substituted with one or more substituents, such as an aliphatic hydrocarbon group and an aromatic hydrocarbon group. The above "aliphatic hydrocarbon group" may be either linear, branched, or cyclic, and may be either saturated or unsaturated. The hydrocarbon group may also contain one or more ring structures.

As used herein, examples of the substituent of the "hydrocarbon group" include, but are not limited to, one or more groups selected from a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group, each of which is optionally substituted with one or more halogen atoms.

As used herein, unless otherwise specified, examples of the "alkyl group" include an alkyl group having 1 to 12 (preferably 1 to 6, more preferably 1 to 3, and still more preferably 1) carbon atoms (for example, a methyl group, an ethyl group, a propyl group, and an isopropyl group). Such an "alkyl group" may be linear or branched, but is preferably linear. Furthermore, the "alkyl group" may contain a functional group.

Hereinafter, a curable composition of the present disclosure will be described.

The curable composition of the present disclosure comprises a silicone copolymer, a fluoropolyether group-containing compound, and a matrix-forming composition.

[Silicone Copolymer]

The above silicone copolymer has two or more crosslinkable groups, and such a crosslinkable group is a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group, or a precursor group thereof.

In a preferred embodiment, the above silicone copolymer has three or more crosslinkable groups. By having three or more crosslinkable groups, bleedout is less likely to occur.

In a preferred embodiment, the above silicone copolymer is a chain copolymer. Herein, such a chain copolymer refers to a copolymer obtained by chain polymerization. When the silicone copolymer is a chain copolymer, bleedout is less likely to occur.

In a more preferred embodiment, the above chain copolymer is an addition copolymer. Herein, such an addition copolymer refers to a copolymer obtained by addition polymerization. When the silicone copolymer is an addition copolymer, bleedout is less likely to occur.

In a still more preferred embodiment, the above addition copolymer is a radical copolymer or an ionic copolymer. Herein, such a radical copolymer and such an ionic copolymer refer to copolymers obtained by radical polymerization and ionic polymerization, respectively. When the silicone copolymer is a radical copolymer or an ionic copolymer, bleedout is less likely to occur.

In an even more preferred embodiment, the above addition copolymer is a radical copolymer. When the silicone copolymer is a radical copolymer, bleedout is less likely to occur.

In a preferred embodiment, the above silicone copolymer is a block copolymer. Bleedout is less likely to occur when the silicone copolymer is a radical copolymer.

In a preferred embodiment, the above silicone copolymer has a chain siloxane moiety. When the silicone copolymer has a chain siloxane moiety, the dynamic friction coefficient and the static friction coefficient can be reduced more.

In a preferred embodiment, the above silicone copolymer has crosslinkable groups at an end thereof, and preferably has three or more crosslinkable groups at an end thereof. Herein, "having crosslinkable groups at an end thereof" means that the crosslinkable groups are located closer to either end of the molecular backbone than to the siloxane moiety. In other words, it refers to a state in which the siloxane moiety is not present between the crosslinkable groups and any of the molecular ends, or a state in which the crosslinkable groups are not sandwiched between the siloxane moieties.

In a preferred embodiment, the above silicone copolymer is hydrophobic. Here, the term hydrophobic means soluble in a non-aqueous solvent at a concentration of 5% by mass or more. The non-aqueous solvent may be, for example, methyl isobutyl ketone, methyl ethyl ketone, or butyl acetate.

In a preferred embodiment, the above silicone copolymer is dissolved in methyl isobutyl ketone at a concentration of 5% by mass or more, preferably 10% by mass or more, and more preferably 20% by mass or more.

In a more preferred embodiment, the above silicone copolymer is dissolved in methyl isobutyl ketone and methyl ethyl ketone at a concentration of 5% by mass or more, preferably 10% by mass or more, and more preferably 20% by mass or more.

The above silicone copolymer provides a silicone copolymer represented by the following formula (1) or (2):

(1)

(2)

[in the formulas, $R^1$ is a hydrogen atom or a $C_{1-6}$ alkyl group, $R^2$ is each independently at each occurrence a hydrogen atom or a $C_{1-6}$ alkyl group, m is an integer of 1 to 300, $R^4$ is each independently at each occurrence $R^{4a}$ or $R^{4b}$, $R^{4a}$ is each independently at each occurrence a divalent organic group having a crosslinkable group, $R^{4b}$ is each independently at each occurrence a divalent organic group not having a crosslinkable group, the crosslinkable group is: a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group; or a group containing a precursor group thereof, n is an integer of 1 to 90, $X^a$ is each independently a divalent organic group, $X^b$ is each independently a divalent organic group, $R^a$ is each independently an alkyl, phenyl, $—SR^{a1}$, $—OR^{a2}$, $—NR^{a3}{}_2$, $R^{a1}$, $R^{a2}$, $R^{a3}$, $R^{a4}$, $R^{a5}$, and $R^{a6}$ are each independently an alkyl group or a phenyl group, and $R^{a7}$ is a hydrogen atom or a halogen atom.].

In the above formula (1), $R^1$ is a hydrogen atom or a $C_{1-6}$ alkyl group.

$R^1$ is preferably a $C_{1-6}$ alkyl group, and is more preferably a $C_{1-4}$ alkyl group.

In the above formulas (1) and (2), $R^2$ is each independently at each occurrence a hydrogen atom or a $C_{1-6}$ alkyl group.

$R^2$ is, each independently at each occurrence, preferably a $C_{1-6}$ alkyl group, more preferably a $C_{1-3}$ alkyl group, and still more preferably methyl.

In the above formulas (1) and (2), m is an integer of 1 to 300, preferably an integer of 2 to 250, more preferably an integer of 2 to 200, and still more preferably an integer of 5 to 150.

In the above formulas (1) and (2), $R^4$ is each independently at each occurrence $R^{4a}$ or $R^{4b}$.

$R^{4a}$ is each independently at each occurrence a divalent organic group having a crosslinkable group.

The above crosslinkable group means a group that is capable of reacting under certain conditions and forming a crosslinked structure.

The above crosslinkable group is: preferably a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group; or a group containing a silane coupling group, or a precursor group thereof.

Examples of the above crosslinkable group include an epoxy group, a glycidyl group, an alicyclic epoxy group, a vinyl group, an allyl group, an optionally substituted acryloyl group, a cinnamoyl group, a 2,4-hexadienoyl group, a vinyl ether (vinyloxy) group, a hydroxyl group, an oxetanyl group, an isocyanate group, a catechol group, a thiol group, an amino group, an alkylamino group, a dialkylamino group, an azide group, a phosphoric acid-containing group, a carboxyl group, an imidazolyl group, a triazolyl group, a benzotriazolyl group, a tetrazolyl group, a halogen atom, and a silane coupling group, and a precursor group thereof.

The above alicyclic epoxy group is preferably a group represented by the following formula:

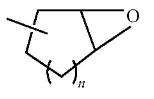

(in the formula, n is an integer of 1 to 5.).

The above alicyclic epoxy group is more preferably

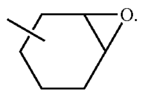

The above optionally substituted acryloyl group is a group represented by $CH_2{=}CX^1{-}C(O){-}$.

$X^1$ represents a hydrogen atom, a chlorine atom, a fluorine atom, or an alkyl group having 1 to 10 carbon atoms optionally substituted with fluorine, and is preferably an alkyl group having 1 to 10 carbon atoms, and more preferably an alkyl group having 1 to 3 carbon atoms, such as a methyl group.

The above optionally substituted acryloyl group is preferably an acryloyl group or a methacryloyl group. Hereinafter, an acryloyl group and a methacryloyl group are also collectively referred to as a "(meth)acryloyl group".

The above phosphoric acid-containing group is not limited as long as it contains a phosphoric acid group, and may be $C_{1-6}$ alkylene-OP(O)(OH) (OR) (in the formula, R is a hydrogen atom or a $C_{1-3}$ alkyl.).

In one embodiment, the above crosslinkable group may be an epoxy group, a glycidyl group, an alicyclic epoxy group, a vinyl group, an allyl group, a (meth)acryloyl group, a cinnamoyl group, a 2,4-hexadienoyl group, or a vinyl ether (vinyloxy) group.

In a preferred embodiment, the above crosslinkable group is an epoxy group, a glycidyl group, or $CH_2{=}CX^{1'}{-}C(O){-}$ (in the formula, $X^{1'}$ represents a hydrogen atom, a chlorine atom, a fluorine atom, or an alkyl group having 1 to 10 carbon atoms optionally substituted with fluorine), and may be preferably an epoxy group, a glycidyl group, or a (meth)acryloyl group.

In another preferred embodiment, the above crosslinkable group may be an epoxy group, a glycidyl group, an alicyclic epoxy group, or a (meth)acryloyl group, preferably an epoxy group, a glycidyl group, or an alicyclic epoxy group, and more preferably an epoxy group or a glycidyl group.

In a preferred embodiment, $R^{4a}$ is a group represented by the following formula:

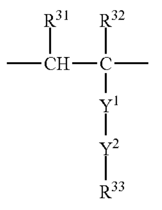

[in the formula, $R^{31}$ is each independently at each occurrence a hydrogen atom or an alkyl group, $R^{32}$ is each independently at each occurrence a hydrogen atom, a chlorine atom, a fluorine atom, or an alkyl group optionally substituted with fluorine, $R^{33}$ is each independently at each occurrence a crosslinkable group, $Y^1$ is a single bond, —C(═O)O—, —C(═O)NH—, —OC(═O)—, —NHC(═O)—, —O—, —N($R^c$)—, an aromatic ring, an aromatic ring having a substituent, or carbazolylene, $R^c$ is an organic group, and $Y^2$ is a single bond or a linker having 1 to 16 atoms in a main chain thereof.].

In the above formula, $R^{31}$ each independently at each occurrence represents a hydrogen atom or an alkyl group. The above alkyl group is preferably a $C_{1-6}$ alkyl group, more preferably a $C_{1-3}$ alkyl group, and still more preferably a methyl group or an ethyl group. $R^{31}$ is preferably a hydrogen atom.

In the above formula, $R^{32}$ each independently at each occurrence represents a hydrogen atom, a chlorine atom, a fluorine atom, or an alkyl group optionally substituted with fluorine. The above alkyl group is preferably a $C_{1-6}$ alkyl group, more preferably a $C_{1-3}$ alkyl group, and still more preferably a methyl group or ethyl group. $R^{32}$ is preferably a methyl group or a hydrogen atom, and is more preferably a hydrogen atom.

$R^{33}$ is each independently at each occurrence a crosslinkable group. Such a crosslinkable group is the same as defined above.

In a preferred embodiment, $R^{33}$ may be an epoxy group, a glycidyl group, an alicyclic epoxy group, a vinyl group, an allyl group, an optionally substituted acryloyl group, a cinnamoyl group, a 2,4-hexadienoyl group, a vinyl ether (vinyloxy) group, a hydroxyl group, an oxetanyl group, an isocyanate group, a catechol group, a thiol group, an amino group, an alkylamino group, a dialkylamino group, an azide group, a phosphoric acid-containing group, a carboxyl group, an imidazolyl group, a triazolyl group, a benzotriazolyl group, a tetrazolyl group, a halogen atom, or a silane coupling group, or a precursor group thereof.

In a more preferred embodiment, $R^{33}$ may be an epoxy group, a glycidyl group, an alicyclic epoxy group, a vinyl group, an allyl group, a (meth)acryloyl group, a cinnamoyl group, a 2,4-hexadienoyl group, or a vinyl ether (vinyloxy) group.

In a still more preferred embodiment, the above crosslinkable group may be an epoxy group, a glycidyl group, an alicyclic epoxy group, or a (meth)acryloyl group, and preferably an epoxy group, a glycidyl group, or a (meth)acryloyl group.

In the above formula, $Y^1$ is a single bond, —C(═O)O—, —C(═O)NH—, —OC(═O)—, —NHC(═O)—, —O—, —N($R^c$)—, phenylene, or carbazolylene. Here, $R^c$ represents an organic group, and is preferably an alkyl group. The above alkyl group is preferably a $C_{1-6}$ alkyl group, more preferably a $C_{1-3}$ alkyl group and still more preferably a methyl group or an ethyl group. As for these groups with respect to $Y^1$, the left side thereof is bonded to C in the formula, and the right side thereof is bonded to $Y^2$.

In one embodiment, $Y^1$ is —C(═O)O—, —C(═O)NH—, —OC(═O)—, —NHC(═O)—, —O—, —N($R^c$)—, phenylene, or carbazolylene. Here, $R^c$ represents an organic group and is preferably an alkyl group.

$Y^1$ is preferably —C(═O)O—, —O—, or carbazolylene, more preferably —C(═O)O— or —O—, and still more preferably —C(═O)O—.

In the above formula, $Y^2$ represents a single bond or a linker having 1 to 16, preferably 2 to 12, and more preferably 2 to 10 atoms in a main chain thereof. Here, the above main chain means the portion in $Y^2$ that links $Y^1$ and $R^{33}$ by the minimum number of atoms.

Examples of such $Y^2$ include, but are not limited to:

$—(CH_2—CH_2—O)_{p1}—$ (p1 represents an integer of 1 to 10, preferably an integer of 1 to 6, and more preferably an integer of 1 to 4);

$—(CHR^d)_{p2}—O—$ (p2 is an integer of 1 to 40, preferably an integer of 1 to 10, more preferably an integer of 1 to 6, still more preferably an integer of 1 to 4, and even more preferably an integer of 2 to 4, and $R^d$ represents hydrogen or a methyl group);

$—(CH_2)_{p3}—O—(CH_2)_{p4}—$ (p3 is an integer of 1 to 10, preferably an integer of 1 to 6, and more preferably an integer of 1 to 4, and p4 is an integer of 0 to 10, preferably an integer of 0 to 6, and more preferably an integer of 0 to 4, and in one embodiment, represents an integer of 1 to 10, preferably an integer of 1 to 6, and more preferably an integer of 1 to 4);

$—(CH_2—CH_2—O)_{p5}—CO—NH—CH_2—CH_2—O—$ (p5 represents an integer of 1 to 10);

$—(CH_2)_{p6}—$ (p6 represents an integer of 1 to 6);

$—(CH_2)_{p7}—O—CONH—(CF_{12})_{p8}—$ (p7 represents an integer of 1 to 8, preferably 2 or 4, and p8 represents an integer of 1 to 6, preferably 3);

$—(CH_2)_{p9}—NHC(=O)O—(CH_2)_{p10}—$ (p9 represents an integer of 1 to 6, preferably 3, and p10 represents an integer of 1 to 8, preferably 2 or 4); and —O— (provided that $Y^1$ is not —O—).

Examples of the preferred $Y^2$ include $—(CH_2—CH_2—O)_{p1}—$ (p1 represents an integer of 1 to 10), $—(CHR^d)_{p2}—O—$ (p2 is an integer of 1 to 40, and $R^d$ represents hydrogen or a methyl group), $—(CH_2)_{p3}—O—(CH_2)_{p4}—$ (p3 is an integer of 1 to 10, and p4 represents an integer of 1 to 10), and $—(CH_2)_{p7}—O—CONH—(CH_2)_{p8}—$ (p7 represents an integer of 1 to 8, preferably 2 or 4, and p8 represents an integer of 1 to 6, preferably 3). Note that, as for these groups, the left end thereof is bonded to the side of the molecular backbone (the side of $Y^1$), and the right end thereof is bonded to the side of the functional group selected from substituent group A (the side of $R^{33}$).

$R^{4a}$ is still more preferably a group represented by the following formula:

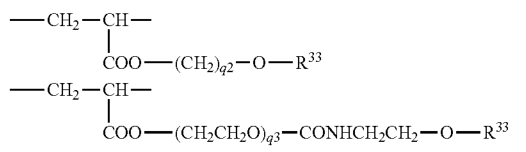

(in the formula, q2 is an integer of 1 to 10, preferably an integer of 1 to 6, more preferably an integer of 1 to 4, and still more preferably an integer of 2 to 4, and q3 is an integer of 1 to 10, preferably an integer of 1 to 6, more preferably an integer of 1 to 4, and still more preferably an integer of 1 to 2.).

$R^{4b}$ is each independently at each occurrence a divalent organic group not having a crosslinkable group.

$R^{4b}$ is preferably $—CHR^{4c}—CR^{4d}R^{4e}—$. Here, $R^{4c}$ and $R^{4d}$ each independently represent a hydrogen atom or an alkyl group, and the $R^{4e}$ group is $—Y^3—R^{4f}$. Here, $Y^3$ is the same as defined in $Y^1$, and $R^{4f}$ is an organic group not having a crosslinkable group, and is a group that an $R^{4g}$ group described later is bonded via a linker or directly to $Y^3$.

Such a linker is preferably any of the following:

(a) $—(CH_2—CH_2—O)_{s1}—$ (s1 represents an integer of 1 to 10, preferably an integer of 1 to 6, and more preferably an integer of 1 to 4.);

(b) $—(CHR^{4h})_{s2}—O—$ (s2 is the number of repetitions, which is an integer of 1 to 40, preferably an integer of 1 to 10, more preferably an integer of 1 to 6, still more preferably an integer of 1 to 4, and even more preferably an integer of 2 to 4. $R^{4h}$ represents hydrogen atom or a methyl group.);

(c) $—(CH_2)_{s3}—O—(CH_2)_{s4}—$ (s3 is an integer of 1 to 10, preferably an integer of 1 to 6, and more preferably an integer of 1 to 4, and s4 is an integer of 0 to 10, preferably an integer of 0 to 6, and more preferably an integer of 0 to 4, and in one embodiment, represents an integer of 1 to 10, preferably an integer of 1 to 6, and more preferably an integer of 1 to 4);

(d) $—(CH_2—CH_2—O)_{s1}—CO—NH—CH_2—CH_2—O—$ (s1 is the same as defined above.);

(e) $—(CH_2)_{s5}—$ (s5 represents an integer of 1 to 6.);

(f) $—(CH_2)_{s6}—O—CONH—(CH_2)_{s7}—$ (s6 represents an integer of 1 to 8, preferably 2 or 4. s7 represents an integer of 1 to 6, preferably 3.); and (g) —O— (provided that $Y^3$ is not —O—).

$R^{4g}$ is preferably any of the following groups:

(i) an alkyl group examples: methyl, ethyl, propyl, isopropyl, butyl, isobutyl, tert-butyl, pentyl, hexyl, heptyl, octyl, dodecyl, octadecyl (ii) a chain group containing an alkyl group substituted with fluorine examples:

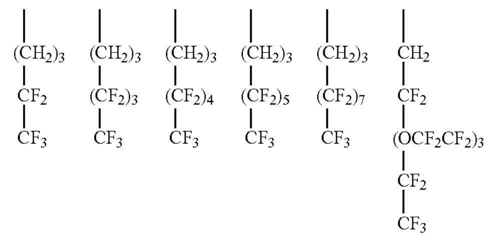

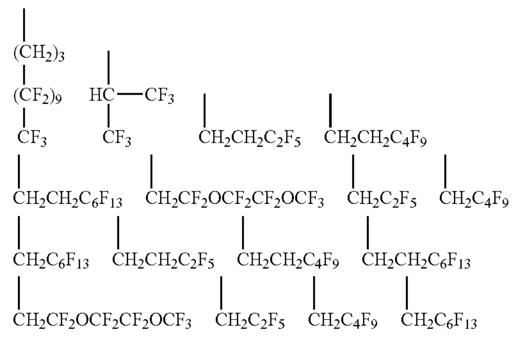

(iii) a group containing one or more cyclic moieties selected from the group consisting of a monocyclic carbocycle, a bicyclic carbocycle, a tricyclic carbocycle, and a tetracyclic carbocycle examples:

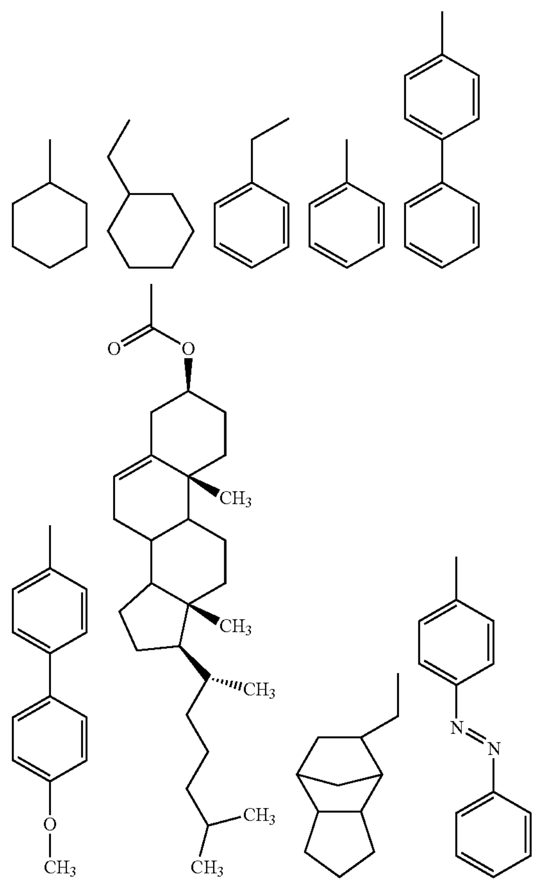

(iv) hydrogen (provided that the hydrogen atom is not bonded to the oxygen atom of the linker)

(v) a group containing an imidazolium salt examples:

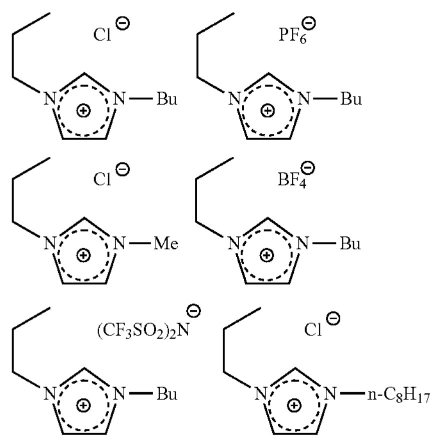

-continued

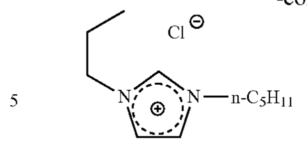

(vi) a group containing silicon

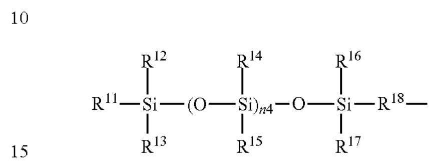

In the above formula, $R^{11}$, $R^{12}$, $R^{13}$, $R^{14}$, $R^{15}$, $R^{16}$, and $R^{17}$ each independently represent an alkyl group or an aryl group.

Examples of the above alkyl group include, but are not limited to, an alkyl group having 1 to 10 carbon atoms and a cycloalkyl group having 3 to 20 carbon atoms, and it is preferably an alkyl group having 1 to 6 carbon atoms. Specific examples thereof include a n-butyl group for $R^{11}$ and a methyl group for $R^{12}$ to $R^{17}$.

Examples of the above aryl group include, but are not limited to, an aryl group having 6 to 20 carbon atoms. Such an aryl group may contain 2 or more rings. A preferred aryl group is a phenyl group.

The above alkyl group and aryl group may contain a heteroatom such as a nitrogen atom, an oxygen atom, and a sulfur atom in their molecular chain or ring, if desired.

Furthermore, the above alkyl group and aryl group may be substituted with one or more substituents selected from a halogen; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group, each of which is optionally substituted with one or more halogens, if desired.

In the above formula, $R^{18}$ represents a divalent organic group.

$R^{18}$ is preferably $—(CH_2)_{r''}—$ (in the formula, r" is an integer of 1 or more and 20 or less, preferably an integer of 1 or more and 10 or less), and is more preferably $—(CH_2)_{r''}—$ (in the formula, r" is an integer of 1 or more and 10 or less).

In the above formula, n4 is each independently an integer of 1 or more and 500 or less. Such n4 is preferably an integer of 1 or more and 200 or less, and is more preferably 10 or more and 200 or less.

$R^{4g}$ is more preferably a hydrogen atom (excluding hydrogen bonded to 0 to form a hydroxyl group) or an alkyl group that may be fluorinated and bonded via an ethylene chain or an oxyethylene chain; more preferably a hydrogen atom, a methoxyethyl group, an isobutyl group, or $R^{4i}—CF_2—(CF_2)_{s6}—(CH_2)_{s7}—O—(CH_2)_2—$ ($R^{4i}$ is a fluorine atom or a hydrogen atom, s6 is an integer of 0 to 6, and s7 is an integer of 1 to 6); and still more preferably a 3-(perfluoroethyl) propoxyethyl group [rational formula: $CF_3—(CF_2)—(CH_2)_3—O—(CH_2)_2—$].

In $R^4$, the structural unit $R^{4a}$ and the structural unit $R^{4b}$ may each form a block or may be bonded randomly.

In one embodiment, in $R^4$, the structural unit $R^{4a}$ and the structural unit $R^{4b}$ each form a block.

In one embodiment, in $R^4$, the structural unit $R^{4a}$ and the structural unit $R^{4b}$ are bonded randomly.

In one embodiment, $R^4$ is $R^{4a}$. That is, $R^4$ consists of the structural unit $R^{4a}$ having a crosslinkable group.

In a preferred embodiment, the number of $R^{4a}$ (polymerization degree) is 1 to 90, preferably 2 to 70, more preferably 2 to 50, and still more preferably 3 to 30.

In one embodiment, $R^4$ is $R^{4b}$. That is, $R^4$ consists of the structural unit $R^{4b}$ not having a crosslinkable group.

In a preferred embodiment, the number of $R^{4b}$ (polymerization degree) is 1 to 90, preferably 2 to 70, more preferably 2 to 50, and still more preferably 3 to 30.

In the above formula, n is an integer of 1 to 90, preferably an integer of 2 to 70, more preferably an integer of 2 to 50, and still more preferably an integer of 3 to 30.

In the above formulas (1) and (2), $X^a$ is each independently a divalent organic group.

In the above formulas (1) and (2), $X^b$ is each independently a divalent organic group.

In the above formulas, —$X^a$—$X^b$— is understood to be part of a linker connecting Si and $R^4$ in the silicone copolymers represented by the formulas (1) and (2). Accordingly, $X^a$ and $X^b$ may be any divalent organic group as long as the compounds represented by the formulas (1) and (2) can be stably present.

In one embodiment, $X^a$ may be a group represented by

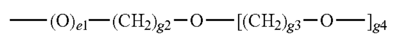

[in the formula, e1 is 0 or 1;

g2 and g3 are each independently an integer of 1 to 10, preferably an integer of 2 to 8, more preferably an integer of 2 to 6, and still more preferably an integer of 2 to 4; and g4 is 0 or 1].

Note that, as for these groups, the left end thereof is bonded to Si and the right end thereof is bonded to $X^b$.

In a preferred embodiment, $X^a$ may be a group represented by

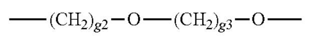

[in the formula, g2 is an integer of 1 to 10, preferably an integer of 2 to 8, more preferably an integer of 2 to 6, and still more preferably an integer of 2 to 4, such as 3; and g3 is an integer of 1 to 10, preferably an integer of 2 to 8, more preferably an integer of 2 to 6, and still more preferably an integer of 2 to 4, such as 2.].

Note that, as for these groups, the left end thereof is bonded to Si, and the right end thereof is bonded to $X^b$.

In the above formulas, $X^b$ is each independently a divalent organic group.

In one embodiment, $X^b$ may be a group represented by the following formula:

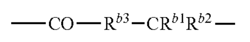

[in the formula:

$R^{b1}$ and $R^{b2}$ are each independently a hydrogen atom, a $C_{1-3}$ alkyl group, a phenyl group, or —CN; and $R^{b3}$ is a single bond or an optionally substituted $C_{1-6}$ alkylene group.].

Note that, as for such a group, the left end thereof is bonded to $X^a$ and the right end thereof is bonded to $R^4$.

$R^{b1}$ and $R^{b2}$ are each independently preferably a $C_{1-3}$ alkyl group, a phenyl group, or —CN, and more preferably a $C_{1-3}$ alkyl group or —CN. The $C_{1-3}$ alkyl group is preferably a methyl group or an ethyl group, and is more preferably a methyl group.

In one embodiment, $R^{b1}$ is a $C_{1-3}$ alkyl group, preferably a methyl group, and $R^{b2}$ is a hydrogen atom or —CN.

The substituent in the "optionally substituted $C_{1-6}$ alkylene group" in $R^{b3}$ is preferably a $C_{1-3}$ alkyl group or a phenyl group, and is preferably a $C_{1-3}$ alkyl group. The $C_{1-3}$ alkyl group is preferably a methyl group or an ethyl group, and more preferably a methyl group. The number of the substituents may be one or two or more.

The $C_{1-6}$ alkylene group in $R^{b3}$ may be preferably a $C_{1-3}$ alkylene group, and more preferably a $C_{2-3}$ alkylene group, such as a dimethylene group.

In one embodiment, $R^{b3}$ is a single bond.

In another embodiment, $R^{b3}$ is an optionally substituted $C_{1-6}$ alkylene group, and is preferably a $C_{1-6}$ alkylene group.

In the above formulas, $R^a$ is an alkyl, phenyl, —$SR^{a1}$, —$OR^{a2}$, —$NR^{a3}_2$,

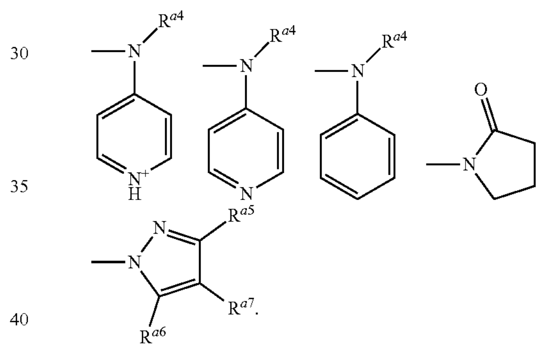

$R^a$ may be part of a so-called RAFT agent.

In the above formulas, $R^{a1}$, $R^{a2}$, $R^{a3}$, $R^{a4}$, $R^{a5}$, and $R^{a6}$ are each independently an alkyl group or a phenyl group.

$R^{a1}$ is preferably a $C_{1-20}$ alkyl group, more preferably a $C_{3-18}$ alkyl group, and still more preferably a $C_{4-12}$ alkyl group.

$R^{a2}$ is preferably a phenyl group or a $C_{1-20}$ alkyl group. The $C_{1-20}$ alkyl group is preferably a $C_{1-10}$ alkyl group, more preferably a $C_{1-6}$ alkyl group, and still more preferably a $C_{1-3}$ alkyl group.

$R^{a3}$ is preferably a $C_{1-20}$ alkyl group, more preferably a $C_{1-10}$ alkyl group, still more preferably a $C_{1-6}$ alkyl group, and even more preferably a $C_{1-3}$ alkyl group.

$R^{a4}$ is preferably a $C_{1-6}$ alkyl group, more preferably a $C_{1-3}$ alkyl group, and still more preferably a methyl group.

$R^{a5}$ is preferably a $C_{1-6}$ alkyl group, more preferably a $C_{1-3}$ alkyl group, and still more preferably a methyl group.

$R^{a6}$ is preferably a $C_{1-6}$ alkyl group, more preferably a $C_{1-3}$ alkyl group, and still more preferably a methyl group.

$R^{a7}$ is a hydrogen atom or a halogen atom (such as fluorine, chlorine, bromine, or iodine, and preferably chlorine).

In one embodiment, $R^a$ is —$SR^{a1}$ or —$OR^{a2}$.

The number average molecular weight of the above silicone copolymer may be, but is not limited to, $2\times10^2$ to $1\times10^5$, preferably $1\times10^3$ to $5\times10^4$, and more preferably $3\times10^3$ to $2\times10^4$. The number average molecular weight can be determined by gel permeation chromatography (GPC).

The above silicone copolymer can be synthesized by utilizing, for example, so-called reversible addition-fragmentation chain transfer (RAFT) type radical polymerization.

At first, a RAFT agent having a siloxane group is prepared. For example, a compound (A) having a RAFT skeleton (—SC(═S)—) and a compound (B1) or (B2) having a siloxane group are allowed to react with each other:

(A)

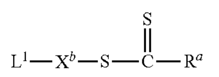

(B1)

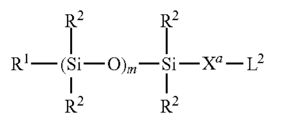

(B2)

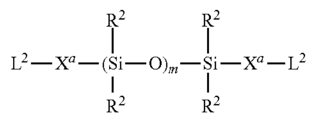

[in the formulas, $R^a$, $R^1$, $R^2$, $X^a$, $X^b$, and m are the same as defined above; and $L^1$ and $L^2$ are each a moiety to be removed.]

and a chain transfer agent (1a) or (2a) having a siloxane group can be obtained:

(1a)

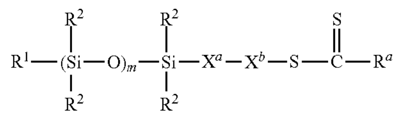

(2a)

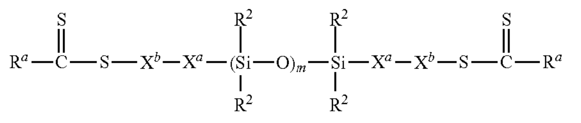

in the formulas, $R^a$, $R^1$, $R^2$, $X^a$, $X^b$, and m are the same as defined above.].

By allowing the chain transfer agent (1a) or (2a) obtained as described above and a monomer having an unsaturated bond to react with each other, the compound represented by the above formula (1) or (2) can be obtained. Such a reaction is so-called RAFT polymerization, and as the reaction conditions, conditions generally used in RAFT polymerization can be used.

[Fluoropolyether Group-Containing Compound]

The above fluoropolyether group-containing compound is not limited as long as it is a compound containing a fluoropolyether group.

Here, the fluoropolyether group refers to a group represented by $—(C_xR_{2x}O)_y—$ (in the formula, R is each independently a hydrogen atom, a fluorine atom, or a chlorine atom, x is an integer of 1 to 8, and y is an integer of 1 or more, provided that at least one R is a fluorine atom.).

In one embodiment, the above fluoropolyether group-containing compound has a fluorine element ratio in the range of 2 to 70% by weight, preferably 10 to 60% by weight. When the fluoropolyether group-containing compound has a fluorine element ratio in the above range, the water- and oil-repellency is improved more.

In a preferred embodiment, the above fluoropolyether group-containing compound is a chain copolymer. Here, such a chain copolymer refers to a copolymer obtained by chain polymerization. When the fluoropolyether group-containing compound is a chain copolymer, bleedout is less likely to occur.

In a more preferred embodiment, the above chain copolymer is an addition copolymer. Here, such an addition copolymer refers to a copolymer obtained by addition polymerization. When the fluoropolyether group-containing compound is an addition copolymer, bleedout is less likely to occur.

In a still more preferred embodiment, the above addition copolymer is a radical copolymer or ionic copolymer. Here, such a radical copolymer and such an ionic copolymer refer to copolymers obtained by radical polymerization and ionic polymerization, respectively. When the fluoropolyether group-containing compound is a radical copolymer or an ionic copolymer, bleedout is less likely to occur.

In an even more preferred embodiment, the above addition copolymer is a radical copolymer. When the fluoropolyether group-containing compound is a radical copolymer, bleedout is less likely to occur.

In a preferred embodiment, the above fluoropolyether group-containing compound is a block copolymer. Bleedout is less likely to occur if the silicone copolymer is a radical copolymer.

In one embodiment, the above fluoropolyether group-containing compound is a fluoropolyether group-containing compound represented by any of the general formulas (3) to (5):

(3)

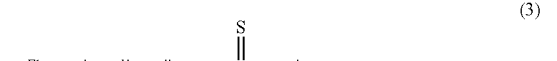

(4)

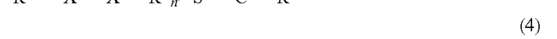

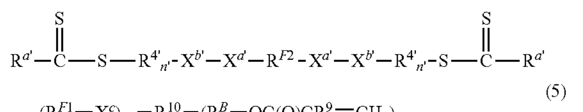

(5)

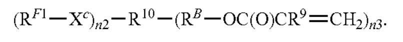

$(R^{F1}—X^c)_{n2}—R^{10}—(R^B—OC(O)CR^9═CH_2)_{n3}$.

In a preferred embodiment, the above fluoropolyether group-containing compound is a fluoropolyether group-containing compound represented by the general formula (3) or (4):

(3)

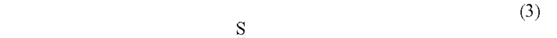

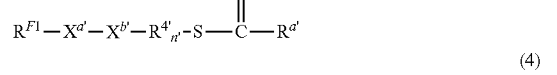

(4)

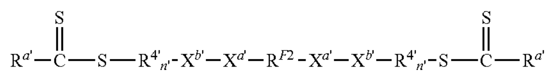

[in the formulas:

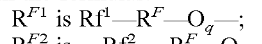

$R^{F1}$ is $Rf^1—R^F—O_q—$;

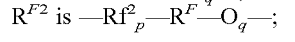

$R^{F2}$ is $—Rf^2_p—R^F—O_q—$;

$Rf^1$ is a $C_{1-16}$ alkyl group optionally substituted with one or more fluorine atoms;

$Rf^2$ is a $C_{1-6}$ alkylene group optionally substituted with one or more fluorine atoms;

$R^F$ is each independently a divalent fluoropolyether group;

p is 0 or 1;

q is each independently 0 or 1;

$R^{4'}$ is each independently at each occurrence $R^{4a'}$ or $R^{4b'}$;

$R^{4a'}$ is each independently at each occurrence a divalent organic group having a functional group selected from substituent group A;

$R^{4b'}$ is each independently at each occurrence a divalent organic group not having a functional group selected from substituent group A;

the substituent group A is: a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, and a silane coupling group; and a precursor group thereof;

n' is an integer of 1 to 100;

$X^{a'}$ is each independently a divalent organic group;

$X^{b'}$ is each independently a divalent organic group;

$R^{a'}$ is each independently an alkyl, phenyl, $—SR^{a1}$, $—OR^{a2}$, $—NR^{a3}{}_2$,

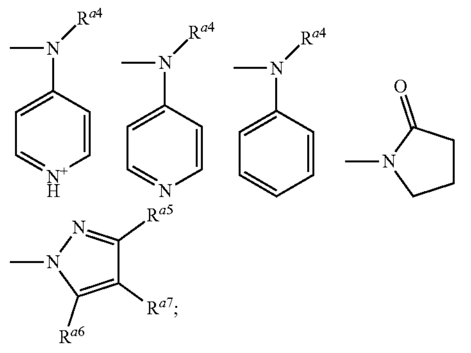

$R^{a1}$, $R^{a2}$, $R^{a3}$, $R^{a4}$, $R^{a5}$, and $R^{a6}$ are each independently an alkyl group or a phenyl group; and $R^{a7}$ is a hydrogen atom or a halogen atom.].

Since the curable composition of the present disclosure contains, in addition to the above silicone copolymer, the above fluoropolyether group-containing compound, the water- and oil-repellency and friction durability of the resulting surface-treating layer are improved more.

In the above formula (3), $R^{F1}$ is $Rf^1—R^F—O_q—$.

In the above formula (4), $R^{F2}$ is $—Rf^2{}_p—R^F—O_q—$.

In the above formula, $Rf^1$ is each independently a $C_{1-16}$ alkyl group optionally substituted with one or more fluorine atoms.

In the above $C_{1-16}$ alkyl group optionally substituted with one or more fluorine atoms, the "$C_{1-16}$ alkyl group" may be linear or branched, and is preferably a linear or branched $C_{1-6}$ alkyl group, in particular $C_{1-3}$ alkyl group, and more preferably a linear $C_{1-6}$ alkyl group, in particular $C_{1-3}$ alkyl group.

$Rf^1$ is preferably a $C_{1-16}$ alkyl group substituted with one or more fluorine atoms, more preferably a $CF_2H—C_{1-15}$ perfluoroalkylene group, and still more preferably a $C_{1-16}$ perfluoroalkyl group.

The above $C_{1-16}$ perfluoroalkyl group may be linear or branched, and is preferably a linear or branched $C_{1-6}$ perfluoroalkyl group, in particular $C_{1-3}$ perfluoroalkyl group, more preferably a linear $C_{1-6}$ perfluoroalkyl group, in particular $C_{1-3}$ perfluoroalkyl group, and specifically $—CF_3$, $—CF_2CF_3$, or $—CF_2CF_2CF_3$.

In the above formula, $Rf^2$ is a $C_{1-6}$ alkylene group optionally substituted with one or more fluorine atoms.

In the above $C_{1-6}$ alkylene group optionally substituted with one or more fluorine atoms, the "$C_{1-6}$ alkylene group" may be linear or branched, and is preferably a linear or branched $C_{1-3}$ alkylene group, and more preferably a linear $C_{1-3}$ alkylene group.

$Rf^2$ is preferably a $C_{1-6}$ alkylene group substituted with one or more fluorine atoms, more preferably a $C_{1-6}$ perfluoroalkylene group, and still more preferably a $C_{1-3}$ perfluoroalkylene group.

The above $C_{1-6}$ perfluoroalkylene group may be linear or branched, and is preferably a linear or branched $C_{1-3}$ perfluoroalkylene group, more preferably a linear $C_{1-3}$ perfluoroalkyl group, and specifically $—CF_2—$, $—CF_2CF_2—$, or $—CF_2CF_2CF_2—$.

In the above formula, p is 0 or 1. In one embodiment, p is 0. In another embodiment, p is 1.

In the above formulas, q is each independently 0 or 1. In one embodiment, q is 0. In another embodiment, q is 1.

In the above formulas (3) and (4), $R^F$ is each independently a divalent fluoropolyether group.

$R^F$ is preferably a group represented by the formula:

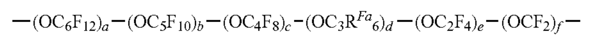

$$—(OC_6F_{12})_a—(OC_5F_{10})_b—(OC_4F_8)_c—(OC_3R^{Fa}{}_6)_d—(OC_2F_4)_e—(OCF_2)_f—$$

in the formula:

$R^{Fa}$ is each independently at each occurrence a hydrogen atom, a fluorine atom, or a chlorine atom; and a, b, c, d, e, and f are each independently an integer of 0 to 200, and the sum of a, b, c, d, e, and f is one or more. The occurrence order of the respective repeating units enclosed in parentheses provided with a, b, c, d, e, or f is not limited in the formula.].

$R^{Fa}$ is preferably a hydrogen atom or a fluorine atom, and is more preferably a fluorine atom.

Preferably, a, b, c, d, e, and f may be each independently an integer of 0 to 100.

The sum of a, b, c, d, e, and f is preferably 5 or more, more preferably 10 or more, and it may be, for example, 15 or more or 20 or more. The sum of a, b, c, d, e, and f is preferably 200 or less, more preferably 100 or less, and still more preferably 60 or less, and it may be, for example, 50 or less or 30 or less.

These repeating units may be linear or branched. For example, in the above repeating units, $—(OC_6F_{12})—$ may be $—(OCF_2CF_2CF_2CF_2CF_2CF_2)—$, $—(OCF(CF_3)CF_2CF_2CF_2CF_2)—$, $—(OCF_2CF(CF_3)CF_2CF_2CF_2)—$, $—(OCF_2CF_2CF(CF_3)CF_2CF_2)—$, $—(OCF_2CF_2CF_2CF(CF_3)CF_2)—$, $—(OCF_2CF_2CF_2CF_2CF(CF_3))—$, or the like. $(OC_5F_{10})—$ may be $—(OCF_2CF_2CF_2CF_2CF_2)—$, $—(OCF(CF_3)CF_2CF_2CF_2)—$, $—(OCF_2CF(CF_3)CF_2CF_2)—$, $—(OCF_2CF_2CF(CF_3)CF_2)—$, $—(OCF_2CF_2CF_2CF(CF_3))—$, or the like. $—(OC_4F_8)—$ may be any of $—(OCF_2CF_2CF_2CF_2)—$, $—(OCF(CF_3)CF_2CF_2)—$, $—(OCF_2CF(CF_3)CF_2)—$, $—(OCF_2CF_2CF(CF_3))—$, $—(OC(CF_3)_2CF_2)—$, $—(OCF_2C(CF_3)_2)—$, $—(OCF(CF_3)CF(CF_3))—$, $—(OCF(C_2F_5)CF_2)—$, and $—(OCF_2CF(C_2F_5))—$. $—(OC_3F_6)—$ (that is, in the above formula, $R^{Fa}$ is a fluorine atom) may be any of —$(OCF_2CF_2CF_2)$—, —$(OCF(CF_3)\ CF_2)$—, and —$(OCF_2CF(CF_3))$—. —$(OC_2F_4)$— may be any of —$(OCF_2CF_2)$— and —$(OCF(CF_3))$—.

In one embodiment, the above repeating units are linear. When the above repeating units are linear, the surface lubricity, friction durability, and the like of the surface-treating layer can be improved.

In one embodiment, the above repeating units are branched. When the above repeating units are branched, the dynamic friction coefficient of the surface-treating layer can be increased.

In one embodiment, $R^F$ is each independently a group represented by any one of the following formulas (f1) to (f5):

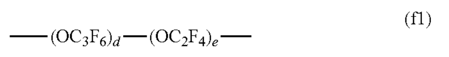

$$—(OC_3F_6)_d—(OC_2F_4)_e— \quad (f1)$$

[in the formula, d is an integer of 1 to 200 and e is 0 or 1.];

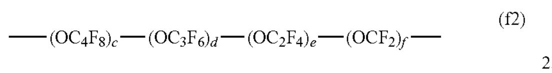

$$—(OC_4F_8)_c—(OC_3F_6)_d—(OC_2F_4)_e—(OCF_2)_f— \quad (f2)$$

[in the formula, c and d are each independently an integer of 0 or more and 30 or less, and e and f are each independently an integer of 1 or more and 200 or less;

the sum of c, d, e, and f is 2 or more; and the occurrence order of the respective repeating units enclosed in parentheses provided with the subscript c, d, e, or f is not limited in the formula.];

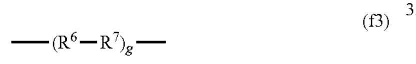

$$—(R^6—R^7)_g— \quad (f3)$$

[in the formula, $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or is a combination of two or three groups independently selected from these groups; and g is an integer of 2 to 100.];

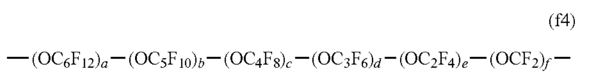

$$—(OC_6F_{12})_a—(OC_5F_{10})_b—(OC_4F_8)_c—(OC_3F_6)_d—(OC_2F_4)_e—(OCF_2)_f— \quad (f4)$$

[in the formula, e is an integer of 1 or more and 200 or less, a, b, c, d, and f are each independently an integer of 0 or more and 200 or less, the sum of a, b, c, d, e, and f is at least 1, and the occurrence order of the respective repeating units enclosed in parentheses provided with a, b, c, d, e, or f is not limited in the formula.], and

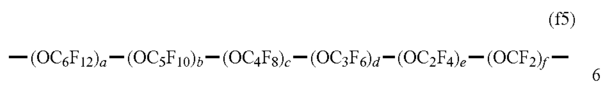

$$—(OC_6F_{12})_a—(OC_5F_{10})_b—(OC_4F_8)_c—(OC_3F_6)_d—(OC_2F_4)_e—(OCF_2)_f— \quad (f5)$$

[in the formula, f is an integer of 1 or more and 200 or less, a, b, c, d, and e are each independently an integer of 0 or more and 200 or less, the sum of a, b, c, d, e, and f is at least 1, and the occurrence order of the respective repeating units enclosed in parentheses provided with a, b, c, d, e, or f is not limited in the formula.].

In the above formula (f1), d is preferably 5 to 200, more preferably 10 to 100, and still more preferably 15 to 50, and it is, for example, an integer of 25 to 35. In one embodiment, e is 1. In another embodiment, e is 0. The above formula (f1) is preferably a group represented by —$(OCF_2CF_2CF_2)_d$— or —$(OCF(CF_3)CF_2)_d$—, and is more preferably a group represented by —$(OCF_2CF_2CF_2)_d$—.

In the above formula (f2), e and f are each independently an integer of preferably 5 or more and 200 or less, and more preferably 10 to 200. In addition, the sum of c, d, e, and f is preferably 5 or more, more preferably 10 or more, and it may be, for example, 15 or more or 20 or more. In one embodiment, the above formula (f2) is preferably a group represented by —$(OCF_2CF_2CF_2CF_2)_c$—$(OCF_2CF_2CF_2)_d$—$(OCF_2CF_2)_e$—$(OCF_2)_f$—. In another embodiment, the formula (f2) may be a group represented by —$(OC_2F_4)_e$—$(OCF_2)_f$—.

In the above formula (f3), $R^6$ is preferably $OC_2F_4$. In the above formula (f3), $R^7$ is preferably a group selected from $OC_2F_4$, $OC_3F_6$, and $OC_4F_8$, or a combination of two or three groups independently selected from these groups, and is more preferably a group selected from $OC_3F_6$ and $OC_4F_8$. Examples of the combination of two or three groups independently selected from $OC_2F_4$, $OC_3F_6$, and $OC_4F_8$ include, but are not limited to, —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. In the above formula (f3), g is an integer of preferably 3 or more, and more preferably 5 or more. g is preferably an integer of 50 or less. In the above formula (f3), $OC_2F_4$, $OC_3F_6$, $OC_4F_8$, $OC_5F_{10}$, and $OC_6F_{12}$ may be either linear or branched, and are preferably linear. In this embodiment, the above formula (f3) is preferably —$(OC_2F_4—OC_3F_6)_g$— or —$(OC_2F_4—OC_4F_8)_g$—.

In the above formula (f4), e is an integer of preferably 1 or more and 100 or less, and more preferably 5 or more and 100 or less. The sum of a, b, c, d, e, and f is preferably 5 or more, more preferably 10 or more, and it is, for example, 10 or more and 100 or less.

In the above formula (f5), f is an integer of preferably 1 or more and 100 or less, and more preferably 5 or more and 100 or less. The sum of a, b, c, d, e, and f is preferably 5 or more, more preferably 10 or more, and it is, for example, 10 or more and 100 or less.

In one embodiment, $R^F$ is a group represented by the above formula (f1).

In one embodiment, $R^F$ is a group represented by the above formula (f2).

In one embodiment, $R^F$ is a group represented by the above formula (f3).

In one embodiment, $R^F$ is a group represented by the above formula (f4).

In one embodiment, $R^F$ is a group represented by the above formula (f5).

In $R^F$, the ratio of e to f (hereinafter, referred to as an "e/f ratio") is 0.1 to 10, preferably 0.2 to 5, more preferably 0.2 to 2, still more preferably 0.2 to 1.5, and even more preferably 0.2 to 0.85. With an e/f ratio of 10 or less, the lubricity, friction durability, and chemical resistance (such as durability against artificial sweat) of a surface-treating layer obtained from the compound are improved more. The smaller the e/f ratio is, the more improved the lubricity and the friction durability of the surface-treating layer are. On the other hand, with an e/f ratio of 0.1 or more, the stability of the compound can be enhanced more. The larger the e/f ratio is, the more improved the stability of the compound is.

In one embodiment, the above e/f ratio is preferably 0.2 to 0.95, and is more preferably 0.2 to 0.9.

In one embodiment, from the viewpoint of heat resistance, the above e/f ratio is preferably 1.0 or more, and is more preferably 1.0 to 2.0.

In the above fluoropolyether group-containing compound, the number average molecular weight of the $R^{F1}$ and $R^{F2}$ moieties is not limited, and is, for example, 500 to 30,000, preferably 1,500 to 30,000, and more preferably 2,000 to 10,000. In the present specification, the number average molecular weight of $R^{F1}$ and $R^{F2}$ is defined as a value obtained by $^{19}$F-NMR measurement.

In another embodiment, the number average molecular weight of the $R^{F1}$ and $R^{F2}$ moieties is 500 to 30,000, preferably 1,000 to 20,000, more preferably 2,000 to 15,000, and still more preferably 2,000 to 10,000, and it may be, for example, 3,000 to 6,000.

In another embodiment, the number average molecular weight of the $R^{F1}$ and $R^{F2}$ moieties may be 4,000 to 30,000, preferably 5,000 to 10,000, and more preferably 6,000 to 10,000.

In the above formulas, $R^{4'}$ is each independently at each occurrence $R^{4a'}$ or $R^{4b'}$.

$R^{4a'}$ is each independently at each occurrence a divalent organic group having a functional group selected from substituent group A.

Examples of the above "functional group selected from substituent group A" include an epoxy group, a glycidyl group, an alicyclic epoxy group, a vinyl group, an allyl group, an optionally substituted acryloyl group, a cinnamoyl group, a 2,4-hexadienoyl group, a vinyl ether (vinyloxy) group, a hydroxyl group, an oxetanyl group, an isocyanate group, a catechol group, a thiol group, an amino group, an alkylamino group, a dialkylamino group, an azide group, a phosphoric acid-containing group, a carboxyl group, an imidazolyl group, a triazolyl group, a benzotriazolyl group, a tetrazolyl group, a halogen atom, and a silane coupling group, and a precursor group thereof.

The above alicyclic epoxy group is the same as described for the above crosslinkable group.

The above optionally substituted acryloyl group is the same as described for the above crosslinkable group.

The above phosphoric acid-containing group is the same as described for the above crosslinkable group.

In one embodiment, the above functional group selected from substituent group A may be an epoxy group, a glycidyl group, an alicyclic epoxy group, a vinyl group, an allyl group, a (meth)acryloyl group, a cinnamoyl group, a 2,4-hexadienoyl group, or a vinyl ether (vinyloxy) group.

In a preferred embodiment, the above functional group selected from substituent group A is an epoxy group, a glycidyl group, or $CH_2{=}CX^{1'}{-}C(O){-}$ (in the formula, $X^{1'}$ represents a hydrogen atom, a chlorine atom, a fluorine atom, or an alkyl group having 1 to 10 carbon atoms optionally substituted with fluorine), and may be preferably an epoxy group, a glycidyl group, or a (meth)acryloyl group.

In another preferred embodiment, the above functional group selected from substituent group A may be an epoxy group, a glycidyl group, an alicyclic epoxy group, or a (meth)acryloyl group, preferably an epoxy group, a glycidyl group, or an alicyclic epoxy group, and more preferably an epoxy group or a glycidyl group.

$R^{4a'}$ is preferably a group represented by the following formula:

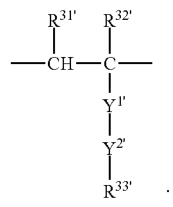

In the above formula, $R^{31'}$ each independently at each occurrence represents a hydrogen atom or an alkyl group. Such $R^{31'}$ is preferably a hydrogen atom.

In the above formula, $R^{32'}$ each independently at each occurrence represents a hydrogen atom, a chlorine atom, a fluorine atom, or an alkyl group optionally substituted with fluorine. Such $R^{32'}$ is preferably a methyl group or a hydrogen atom, and is more preferably a hydrogen atom.

In the above formula, $R^{33'}$ each independently at each occurrence represents an organic group having a functional group selected from substituent group A.

Examples of such a functional group selected from substituent group A include those that are the same as described above, but it is preferably an epoxy group, a glycidyl group, an alicyclic epoxy group, or $CH_2{=}CX^{1'}{-}C(O){-}$ (in the formula, $X^{1'}$ represents a hydrogen atom, a chlorine atom, a fluorine atom, or an alkyl group having 1 to 10 carbon atoms optionally substituted with fluorine). Specific examples thereof include a glycidyl group, $CH_2{=}C(CH_3){-}C(O){-}$, and $CH_2{=}CH{-}C(O){-}$.

In the above formula, $Y^{1'}$ represents a single bond, $-C({=}O)O-$, $-C({=}O)NH-$, $-OC({=}O)-$, $-NHC({=}O)-$, $-O-$, $-N(R^c)-$, phenylene, or carbazolylene. Here, $R^c$ represents an organic group, and it is preferably an alkyl group. As for these groups with respect to $Y^{1'}$, the left side thereof is bonded to C in the formula, and the right side thereof is bonded to $Y^{2'}$.

$Y^{1'}$ is preferably $-C({=}O)O-$, $-O-$, or carbazolylene, more preferably $-C({=}O)O-$ or $-O-$, and still more preferably $-C({=}O)O-$.

In the above formula, $Y^{2'}$ represents a single bond or a linker having 1 to 16 (more preferably 2 to 12, and still more preferably 2 to 10) atoms in a main chain thereof.

Examples of such $Y^2$ include, but are not limited to:

$-(CH_2-CH_2-O)_{p1'}-$ (p1' represents an integer of 1 to 10);

$-(CHR^{d'})_{p2'}-O-$ (p2' is an integer of 1 to 40 and $R^{d'}$ represents hydrogen or a methyl group);

$-(CH_2-CH_2-O)_{p3'}-CO-NH-CH_2-CH_2-O-$ (p3' represents an integer of 1 to 10);

$-CH_2-CH_2-O-CH_2-CH_2-$;

$-(CH_2)_{p4'}-$ (p4' represents an integer of 1 to 6);

$-(CH_2)_{p5'}-O-CONH-(CH_2)_{p6'}$ (p5' represents an integer of 1 to 8, preferably 2 or 4, and p6' represents an integer of 1 to 6, preferably 3);

$-(CH_2)_{p7'}-NHC({=}O)O-(CH_2)_{p8'}-$ (p7' represents an integer of 1 to 6, preferably 3, and p8' represents an integer of 1 to 8, preferably 2 or 4); and $-O-$ (provided that $Y^{1'}$ is not $-O-$).

Preferred examples of $Y^{2'}$ include $-(CH_2-CH_2-O)_{p1'}-$ (p1' represents an integer of 1 to 10) and $-(CHR^{d'})_{p2'}-O-$ (p2' is an integer of 1 to 40 and $R^{d'}$ represents hydrogen or a methyl group), and specific examples thereof include $-CH_2-CH_2-O-$. Note that, as for these groups, the left end thereof is bonded to the side of the molecular backbone (the side of $Y^{1'}$), and the right end thereof is bonded to the side of the functional group selected from substituent group A (the side of $R^{33'}$).

$R^{4a'}$ is still more preferably a group represented by the following formula:

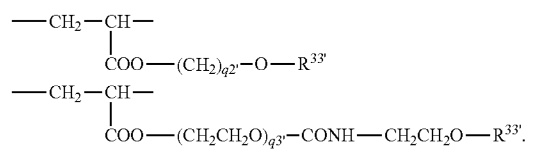

In the above formula, $X^{1'}$ represents a hydrogen atom, a chlorine atom, a fluorine atom, or an alkyl group having 1 to 10 carbon atoms optionally substituted with fluorine, and is preferably an alkyl group having 1 to 10 carbon atoms, such as a methyl group. q2' is an integer of 1 to 10, preferably an integer of 1 to 5, such as 1. q3' is an integer of 1 to 10, preferably an integer of 1 to 5, such as 2.

$R^{4b'}$ is each independently at each occurrence a divalent organic group not having a functional group selected from substituent group A.

Examples of $R^{4b'}$ include the groups described for $R^{4b}$ above, and its preferred embodiment is also the same.

In $R^{4'}$, the structural unit $R^{4a'}$ and the structural unit $R^{4b'}$ may each form a block or may be bonded randomly.

In one embodiment, in $R^{4'}$, the structural unit $R^{4a'}$ and the structural unit $R^{4b'}$ each form a block.

In one embodiment, in $R^{4'}$, the structural unit $R^{4a'}$ and the structural unit $R^{4b'}$ are bonded randomly.

In one embodiment, $R^{4'}$ is $R^{4a'}$. That is, $R^{4'}$ consists of the structural unit $R^{4a'}$ having a functional group selected from substituent group A.

In a preferred embodiment, the number of $R^{4a'}$ (polymerization degree) is 1 to 100, preferably 2 to 70, more preferably 2 to 50, and still more preferably 2 to 30.

In one embodiment, $R^{4'}$ is $R^{4b'}$. That is, $R^{4'}$ consists of the structural unit $R^{4b'}$ not having a functional group selected from substituent group A.

In a preferred embodiment, the number of $R^{4b'}$ (polymerization degree) is 1 to 100, preferably 2 to 70, more preferably 2 to 50, and still more preferably 2 to 30.

In the above formula, n' is an integer of 1 to 100, preferably an integer of 2 to 70, more preferably an integer of 2 to 50, and still more preferably an integer of 3 to 30.

In the above formulas, $X^{a'}$ is each independently a divalent organic group.

In the above formulas, $X^{b'}$ is each independently a divalent organic group.

In the above formulas, $—X^{a'}—X^{b'}—$ is understood to be part of a linker connecting $R^{F1}$ and $R^{4'}$ in the fluoropolyether group-containing compounds represented by the formulas (3) and (4). Accordingly, $X^{a'}$ and $X^{b'}$ may be any divalent organic group as long as the compounds represented by the formulas (3) and (4) can be stably present.

In one embodiment, $X^{a'}$ is each independently a group represented by the following formula:

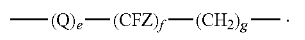

In the formula, e, f, and g are each independently an integer of 0 to 10, the sum of e, f, and g is 1 or more, and the occurrence order of the respective repeating units enclosed in parentheses is not limited in the formula.

In the above formula, Q is each independently at each occurrence an oxygen atom, phenylene, carbazolylene, $—NR^{q}$-(in the formula, $R^{q1}$ represents a hydrogen atom or an organic group), or a divalent polar group. Preferably, Q is an oxygen atom or a divalent polar group.

Examples of the above "divalent polar group" in Q include, but are not limited to, —C(O)—, $—C(=NR^{b})—$, and $—C(O)NR^{q2}—$ (in the formula, $R^{q2}$ represents a hydrogen atom or a lower alkyl group). Such a "lower alkyl group" is, for example, an alkyl group having 1 to 6 carbon atoms, such as methyl, ethyl, or n-propyl, each of which is optionally substituted with one or more fluorine atoms.

In the above formula, Z is each independently at each occurrence a hydrogen atom, a fluorine atom, or a lower fluoroalkyl group, and is preferably a fluorine atom. Such a "lower fluoroalkyl group" is, for example, a fluoroalkyl group having 1 to 6 carbon atoms and preferably 1 to 3 carbon atoms, preferably a perfluoroalkyl group having 1 to 3 carbon atoms, more preferably a trifluoromethyl group or a pentafluoroethyl group, and still more preferably a trifluoromethyl group.

$X^{a'}$ is preferably a group represented by the following formula:

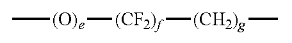

[in the formula, e, f, and g are the same as defined above, and the occurrence order of the respective repeating units enclosed in parentheses is not limited in the formula].

Note that, as for these groups, the left end thereof is bonded to $R^{F1}$.

In one embodiment, $X^{a'}$ may be a group represented by

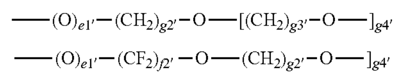

[in the formulas, e1' is 0 or 1;

f2', g2', and g3' are each independently an integer of 1 to 10; and g4' is 0 or 1].

Note that, as for these groups, the left end thereof is bonded to $R^{F1}$.

In a preferred embodiment, $X^{a'}$ may be a group represented by

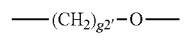

[in the formula, g2' is an integer of 1 to 10.].

Note that, as for such groups, the left end thereof is bonded to $R^{F1}$.

In the above formulas, $X^{b'}$ is each independently a divalent organic group.

Examples of $X^{b'}$ include the groups described for $X^{b}$ above, and its preferred embodiment is also the same.

Examples of $R^{a'}$ include the groups described for $R^{a}$ above, and its preferred embodiment is also the same.

In a preferred embodiment, the above fluoropolyether group-containing compound may be a fluoropolyether group-containing compound represented by the formula (3).

The number average molecular weight of the above fluoropolyether group-containing compound may be, but is not limited to, $2\times10^2$ to $1\times10^3$, preferably $1\times10^3$ to $5\times10^4$, and more preferably $3\times10^3$ to $2\times10^4$. When the number average molecular weight is within such a range, the solubility in a solvent and the contact angle of the surface-treating layer can be increased more. The number average molecular weight can be determined by gel permeation chromatography (GPC).

The polydispersity (weight average molecular weight (Mw)/number average molecular weight (Mn)) of the above fluoropolyether group-containing compound may be preferably 3.0 or less, more preferably 2.5 or less, still more preferably 2.0 or less, and even more preferably 1.5 or less. By reducing the polydispersity, a more homogeneous surface-treating layer can be formed, and the durability of the surface-treating layer can be improved.

The above fluorine-containing polymer can be synthesized by utilizing, for example, so-called reversible addition-fragmentation chain transfer (RAFT) type radical polymerization.

At first, a RAFT agent having a perfluoropolyether group is prepared. For example, a compound (A) having a perfluoropolyether and a compound (B3) or (B4) having a RAFT skeleton (—SC(═S)—) are allowed to react with each other:

(A')

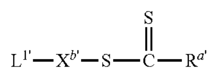

(B3)

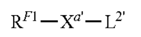

(B4)

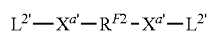

[in the formulas, $R^{a'}$, $R^{F1}$, $R^{F2}$, $X^{a'}$, and $X^{b'}$ are the same as defined above; and $L^{1'}$ and $L^{2'}$ are each a moiety to be removed.]

and a chain transfer agent (3a) or (4a) having a perfluoropolyether group can be obtained:

(3a)

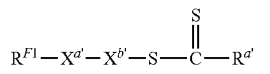

(4a)

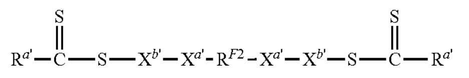

[in the formulas, $R^{a'}$, $R^{F1}$, $R^{F2}$, $X^{a'}$, and $X^{b'}$ are the same as defined above.].

By allowing the chain transfer agent (3a) or (4a) obtained as described above and a monomer having an unsaturated bond to react with each other, the compound represented by the above formula (3) or (4) can be obtained. Such a reaction is so-called RAFT polymerization, and as the reaction conditions, conditions generally used in RAFT polymerization can be used.

In another preferred embodiment, the above fluoropolyether group-containing compound is a fluoropolyether group-containing compound represented by the general formula (5):

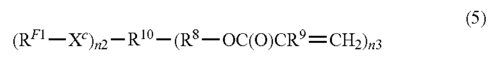

(5)

[in the formula:

$R^{F1}$ is the same as defined above;

$X^c$ is a group represented by the following formula:

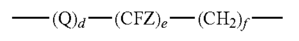

(in the formula, Q represents an oxygen atom, phenylene, carbazolylene, —$NR^a$— (in the formula, $R^a$ represents a hydrogen atom or an organic group), or a divalent polar group; Z represents a hydrogen atom, a fluorine atom, or a lower fluoroalkyl group; and d, e, and f are each independently an integer of 0 or more and 50 or less, the sum of d, e, and f is at least 1, and the occurrence order of the respective repeating units enclosed in parentheses is not limited in the formula.);

$R^{10}$ represents an organic group having a valence of (n2+n3) that optionally has a ring structure, a heteroatom, and/or a functional group;

$R^8$ represents a divalent organic group;

$R^9$ represents a hydrogen atom, a chlorine atom, a fluorine atom or an alkyl group having 1 to 10 carbon atoms optionally substituted with fluorine;

n2 is an integer of 1 to 3; and n3 is an integer of 1 to 3.].

In the above formula (3), $X^c$ is a group represented by the formula: $-(Q)_d-(CFZ)_e-(CH_2)_f-$. Here, d, e, and f are each independently an integer of 0 or more and 50 or less, the sum of d, e, and f is at least 1, and the occurrence order of the respective repeating units enclosed in parentheses is not limited in the formula.

In the above formula, Q represents an oxygen atom, phenylene, carbazolylene, —$NR^a$— (in the formula, $R^a$ represents a hydrogen atom or an organic group), or a divalent polar group, and it is preferably an oxygen atom or a divalent polar group, and more preferably an oxygen atom.

Examples of the above "divalent polar group" in Q include, but are not limited to, —C(O)—, —C(═$NR^b$)—, and —C(O)$NR^b$— (in these formulas, $R^b$ represents a hydrogen atom or a lower alkyl group). Such a "lower alkyl group" is, for example, an alkyl group having 1 to 6 carbon atoms, such as methyl, ethyl, or n-propyl, each of which is optionally substituted with one or more fluorine atoms.

In the above formula, Z represents a hydrogen atom, a fluorine atom, or a lower fluoroalkyl group, and is preferably a fluorine atom.

The above "lower fluoroalkyl group" is, for example, a fluoroalkyl group having 1 to 6 carbon atoms and preferably 1 to 3 carbon atoms, preferably a perfluoroalkyl group having 1 to 3 carbon atoms, more preferably a trifluoromethyl group or a pentafluoroethyl group, and still more preferably a trifluoromethyl group.

$X^c$ is preferably a group represented by the formula: $—(O)_d—(CF_2)_e—(CH_2)_f—$ (in the formula, d, e, and f are the same as defined above, and the occurrence order of the respective repeating units enclosed in parentheses is not limited in the formula).

Examples of the group represented by the above formula: $(O)_d—(CF_2)_e—(CH_2)_f—$ include, for example, a group represented by $—(O)_{d'}—(CF_2)_{e'}—(CH_2)_{f'}—O—[(CH_2)_{f''}—O—]_{f'''}$ (in the formula, d' is 0 or 1, e', f', and f" are each independently an integer of 1 to 10, and f'" is 0 or 1).

In the above formula (3), $R^{10}$ represents an organic group having a valence of (n2+n3) that optionally has a ring structure, a heteroatom, and/or a functional group.

In the above formula (3), n2 is an integer of 1 to 3.

In the above formula (3), n3 is an integer of 1 to 3.

Preferably, n2+n3 is 3, and for example, n2 is 1 and n3 is 2, or n2 is 2 and n3 is 1.

Examples of the above "organic group having a valence of (n2+n3) that optionally has a ring structure, a heteroatom and/or a functional group" in $R^{10}$ include a group derivatized by, from a monovalent organic group, further removing (n2+n3−1) hydrogen atoms.

$R^{10}$ is preferably a group represented by the following formula:

,

,

,

-continued

.

More preferably, $R^{10}$ is a group represented by the following formula:

.

In the above formula (3), $R^8$ represents a divalent organic group. Such $R^8$ is preferably $—O—(CH_2)_r—$ (in the formula, r is an integer of 1 to 10, and preferably an integer of 1 to 3) or $—NH—(CH_2)_r—$ (in the formula, r is the same as defined above), and is more preferably $—O—(CH_2)_r—$ (in the formula, r is an integer of 1 to 3).

In the above formula (3), $R^9$ represents a hydrogen atom, a chlorine atom, a fluorine atom, or an alkyl group having 1 to 10 carbon atoms optionally substituted with fluorine.

$R^9$ is preferably a hydrogen atom or an alkyl group having 1 to 10 carbon atoms, more preferably a hydrogen atom or an alkyl group having 1 to 6 carbon atoms, and still more preferably a hydrogen atom or methyl.

In another embodiment, the above fluorine-containing polymer (3) is at least one fluorine-containing polymer obtained by allowing (a) NCO groups present in a triisocyanate formed by trimerizing a diisocyanate, and (b) active hydrogens in at least one active hydrogen-containing compound represented by the following formulas (a1) and/or (a2):

$$R^{F1}—OC(Z)F(CF_2)_g—(CH_2)_g—OH \quad (a1)$$

$$HO—(CH_2)_h—(CF_2)_gC(Z)F—O—R^{F2}\text{·}OC(Z)F(CF_2)_g—(CH_2)_h—OH \quad (a2)$$

[in the formulas, $R^{F1}$, $R^{F2}$, Z, g, and h are the same as defined above.]

and at least one active hydrogen-containing compound represented by the following formula (a3):

$$CH_2═CR^9C(O)O—R^{30}—OH \quad (a3)$$

[in the formula, $R^9$ is the same as defined above; and $R^{30}$ represents a divalent organic group.]

to react with each other.

In the formula (a3), $R^{30}$ is preferably $—(CH_2)_{r'}—$ (in the formula, r' is an integer of 1 or more and 10 or less, and preferably an integer of 1 to 3), —CH($CH_3$)—, —CH($CH_2CH_3$)—, or —CH($CH_2OC_6H_5$)—, and is more preferably-$(CH_2)_{r'}$— (in the formula, r' is an integer of 1 to 3).

The fluoropolyether group-containing compound represented by the above formula (5) is not limited, but may have a number average molecular weight of $5\times10^2$ to $1\times10^5$. In such a range, it is preferable that the number average molecular weight be 2,000 to 10,000 from the viewpoint of friction durability. The number average molecular weight can be determined by $^{19}$F-NMR.

[Matrix-Forming Composition]

The above matrix-forming composition means a composition containing a compound having at least one carbon-carbon double bond, for example, a compound that is a monofunctional and/or polyfunctional acrylate and methacrylate (hereinafter, acrylate and methacrylate are also collectively referred to as "(meth)acrylate"), a monofunctional and/or polyfunctional urethane (meth)acrylate, or a monofunctional and/or polyfunctional epoxy (meth)acrylate, although not limited thereto. Examples of such a matrix-forming composition include, but are not limited to, a composition generally used as a hard coating agent or an anti-reflective agent, for example, a hard coating agent containing a polyfunctional (meth)acrylate or an anti-reflective agent containing a fluorine-containing (meth)acrylate. Such a hard coating agent is commercially available, for example, as Beam set 502H, 504H, 505A-6, 550B, 575CB, 577, 1402 (trade name) from Arakawa Chemical Industry Co., Ltd.; as EBECRYL40 (trade name) from Daicel Cytec company; and as HR300 series (trade name) from Yokohama Rubber Co., Ltd. The above anti-reflective agent is commercially available, for example, as Optool AR-110 (trade name) from Daikin Industries, Ltd.

As the above matrix-forming composition, a composition containing a compound that is a monofunctional and/or polyfunctional epoxy is also preferable. For example, epoxy compounds such as bisphenol A diglycidyl ether, 2,2'-bis(4-glycidyloxycyclohexyl)propane, 3,4-epoxycyclohexylmethyl-3,4-epoxycyclohexanecarboxylate, vinylcyclohexene dioxide, 2-(3,4-epoxycyclohexyl)-5,5-spiro-(3,4-epoxycyclohexane)-1,3-dioxane, bis(3,4-epoxycyclohexyl) adipate, 1,2-cyclopropanedicarboxylic acid bisglycidyl ester, and triglycidyl isocyanurate can be used. Also usable are hydrogenated epoxy resins, alicyclic epoxy resins, epoxy resins containing isocyanurate rings, bisphenol A type epoxy resins, bisphenol F type epoxy resins, phenol novolac type epoxy resins, cresol novolac type epoxy resins, naphthalene type epoxy resins, biphenyl type epoxy resins, phenol aralkyl type epoxy resins, biphenyl aralkyl type epoxy resins, hydrogenated epoxy resins obtained by hydrogenating aromatic rings of the various epoxy resins, and dicyclopentadiene type epoxy resins, although some overlap with the aforementioned.

[Curable Composition]

In one embodiment, the above curable composition has a mass ratio between the silicone copolymer and the fluoropolyether group-containing compound in the range of 0.1:100 to 100:0.1, preferably 0.5:100 to 100:100. When the mass ratio between the silicone copolymer and the fluoropolyether group-containing compound is in such a range, higher water-repellency and surface lubricity can be obtained, as well as bleedout suppression effects.

In one embodiment, the above curable composition contains 0.01 to 20% by mass, preferably 0.01 to 10% by mass, and more preferably 0.1 to 10% by mass of the silicone copolymer and the fluoropolyether group-containing compound, relative to the solids of the matrix-forming composition.

In a preferred embodiment, the above silicone copolymer is a silicone copolymer represented by the formula (1) or (2) and the above fluoropolyether group-containing compound is a fluoropolyether group-containing compound represented by the formula (3) or (4).

The curable composition of the present disclosure may further contain at least one fluorine-containing oil represented by the following general formula (C):

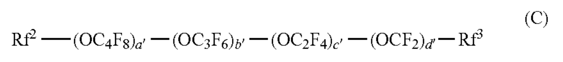

(C)

(hereinafter, also referred to as a "fluorine-containing oil (C)").

In the above formula (C), $Rf^2$ represents an alkyl group having 1 to 16 carbon atoms optionally substituted with one or more fluorine atoms, and $Rf^3$ represents a hydrogen atom, a fluorine atom, or an alkyl group having 1 to 16 carbon atoms optionally substituted with one or more fluorine atoms. Preferably, $Rf^2$ and $Rf^3$ are each independently an alkyl group having 1 to 3 carbon atoms optionally substituted with one or more fluorine atoms, and more preferably a perfluoroalkyl group having 1 to 3 carbon atoms.

In the above formula (C), a', b', c' and d' represent the respective three numbers of repeating units in perfluoro (poly)ether constituting the main backbone of the polymer and are mutually independently an integer of 0 or more and 300 or less, preferably an integer of 0 or more and 200 or less, and the sum of a', b', c' and d' is at least 1, preferably 1 to 300. The occurrence order of the respective repeating units enclosed in parentheses provided with the subscript a', b', c', or d' is not limited in the formula. Among such repeating units, —($OC_4F_8$)— may be any of —($OCF_2CF_2CF_2CF_2$)—, —(OCF($CF_3$) $CF_2CF_2$)—, —($OCF_2CF(CF_3)$ $CF_2$)—, —($OCF_2CF_2CF(CF_3)$)—, —($OC(CF_3)_2CF_2$)—, —($OCF_2C(CF_3)_2$)—, —(OCF($CF_3$)CF($CF_3$))—, —(OCF($C_2F_5$)$CF_2$)—, and —($OCF_2CF(C_2F_5)$)—, and it is preferably —($OCF_2CF_2CF_2CF_2$)—. —($OC_3F_6$)— may be any of —($OCF_2CF_2CF_2$)—, —(OCF($CF_3$)$CF_2$)—, and —($OCF_2CF(CF_3)$)—, and it is preferably —($OCF_2CF_2CF_2$)—. —($OC_2F_4$)— may be any of —($OCF_2CF_2$)— and —(OCF($CF_3$))—, and it is preferably —($OCF_2CF_2$)—.

Examples of the fluorine-containing oil represented by the above general formula (C) include a compound represented by any of the following general formulas (C1) and (C2) (which may be one or a mixture of two or more kinds thereof):

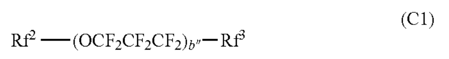

(C1)

[in the formula, $Rf^2$ and $Rf^3$ are as described above, b" is an integer of 0 to 300, and the occurrence order of the respective repeating units enclosed in parentheses provided with the subscript b" is not limited in the formula.] and (C2)

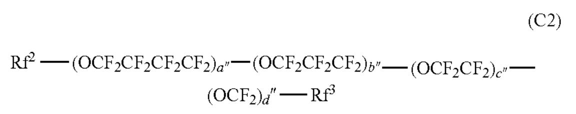

[in the formula, $Rf^2$ and $Rf^3$ are as described above, a" and b" are each independently an integer of 0 to 30, c" and d" are each independently an integer of 0 to 300, and the occurrence order of the respective repeating units enclosed in parentheses provided with the subscript a", b", c", or d" is not limited in the formula.].

The above fluorine-containing oil (C) may have an average molecular weight of about 1,000 to 30,000. Accordingly, high surface lubricity can be obtained.

In the curable composition of the present disclosure, such a fluorine-containing oil (C) may be contained in an amount of, for example, 0 to 80 parts by mass, and preferably 0 to 40 parts by mass, relative to total 100 parts by mass of the above fluoropolyether group-containing compound (in the case of two or more kinds, the total thereof, and the same applies below).

In the curable composition of the present disclosure, such a fluorine-containing oil (C) may be contained in an amount of preferably 40% by mass or less, relative to the total of the above fluoropolyether group-containing compound and fluorine-containing oil (C).

The above fluorine-containing oil (C) contributes to improving the surface lubricity of the surface-treating layer.

In addition to the components described above, the curable composition of the present disclosure may contain other components such as a silicone oil, an active energy ray radical curing initiator, a thermal acid generator, and an active energy ray cationic curing initiator.

For example, a linear or cyclic silicone oil having 2,000 or less siloxane bonds may be used as the above silicone oil. The linear silicone oil may be a so-called straight silicone oil or modified silicone oil. Examples of the straight silicone oil include dimethyl silicone oil, methyl phenyl silicone oil, and methyl hydrogen silicone oil. Examples of the modified silicone oil include those obtained by modifying a straight silicone oil with polyether, higher fatty acid ester, fluoroalkyl, amino, epoxy, carboxyl, alcohol, or the like. Examples of the cyclic silicone oil include cyclic dimethylsiloxane oil.

In the curable composition of the present disclosure, such a silicone oil may be contained in an amount of, for example, 0 to 50 parts by mass, and preferably 0 to 10 parts by mass, relative to total 100 parts by mass of the above silicone copolymer and fluoropolyether group-containing compound (in the case of two or more kinds, the total thereof, and the same applies below).

As the above active energy ray radical curing initiator, for example, one is used that generates radicals for the first time upon irradiation with electromagnetic waves in a wavelength region of 350 nm or less, such as ultraviolet rays, electron beams, X-rays, γ-rays, or the like, and functions as a catalyst that initiates curing (crosslinking reaction) of a curable site (for example, carbon-carbon double bond) of the silicone copolymer and the fluoropolyether group-containing compound, and usually generates radicals with ultraviolet rays.

The active energy ray radical curing initiator in the curable composition of the present disclosure is appropriately selected depending on the type of curable site in the silicone copolymer and the fluoropolyether group-containing compound, the type of active energy ray to be used (wavelength range or the like), irradiation intensity, or the like, and generally, the following can be exemplified as the initiator for curing the silicone copolymer and the fluoropolyether group-containing compound having a radical-reactive curable site (carbon-carbon double bond) using the active energy ray in the ultraviolet region.

—Acetophenones acetophenone, chloroacetophenone, diethoxyacetophenone, hydroxyacetophenone, α-aminoacetophenone, hydroxypropiophenone, 2-methyl-1-[4-(methylthio)phenyl]-2-morpholinopropane-1-one, and the like.

—Benzoins benzoin, benzoin methyl ether, benzoin ethyl ether, benzoin isopropyl ether, benzoin isobutyl ether, benzyl dimethyl ketal, and the like.

—Benzophenones benzophenone, benzoylbenzoic acid, methyl benzoylbenzoate, 4-phenylbenzophenone, hydroxybenzophenone, hydroxy-propylbenzophenone, acrylated benzophenone, Michler's ketone, and the like.

—Thioxanones thioxanthone, chlorothioxanthone, methylthioxanthone, diethylthioxanthone, dimethylthioxanthone, and the like.

—Others benzyl, α-acyloxime ester, acylphosphine oxide, glyoxyester, 3-ketocoumarin, 2-ethylanthraquinone, camphorquinone, anthraquinone, and the like.

These active energy ray curing initiators may be used alone or in combination of two or more kinds thereof.

The above active energy ray curing initiator is contained in an amount of 0.01 to 1,000 parts by mass, and preferably 0.1 to 500 parts by mass, relative to 100 parts by mass of the total of the silicone copolymer, the fluoropolyether group-containing compound, and, if present, the fluorine-containing oil (C), although there is no limitation on the amount thereof.

By using the above thermal acid generator, decomposition reaction of the compound containing a cationic species is caused by heat, and curing (crosslinking reaction) of a curable site (for example, cyclic ether) of the silicone copolymer and the fluoropolyether group-containing compound having the curable site is initiated.

The above thermal acid generator is suitably, for example, a compound represented by the following general formula (a):

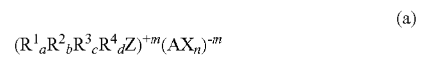

(a)

(in the formula, Z represents at least one element selected from the group consisting of S, Se, Te, P, As, Sb, Bi, O, N, and halogen elements; $R^1$, $R^2$, $R^3$, and $R^4$ are the same or different and represent an organic group; a, b, c and d are 0 or a positive number, and the total of a, b, c, and d is equal to the valence of Z; the cation $(R^1{}_aR^2{}_bR^3{}_cR^4{}_dZ)^{+m}$ represents an onium salt; A represents a metal element or a metalloid element, which is the central atom of the halide complex, and is at least one selected from the group consisting of B, P, As, Al, Ca, In, Ti, Zn, Sc, V, Cr, Mn, and Co; X represents a halogen element; m is the net charge of the halide complex ion; and n is the number of halogen elements in the halide complex ion.

Specific examples of the anion $(AX_n)^{-m}$ of the above general formula (a) include tetrafluoroborate ($BF_4^-$), hexafluorophosphate ($PF_6^-$), hexafluoroantimonate ($SbF_6^-$), hexafluoroarsenate ($AsF_6^-$), and hexachloroantimonate ($SbCl_6^-$). Furthermore, anions represented by the general formula $AXn(OH)^-$ can also be used. Examples of other anions include perchlorate ion ($ClO_4^-$), trifluoromethylsulfite ion ($CF_3SO_3^-$) fluorosulfonate ion ($FSO_3^-$), toluenesulfonate ion, and trinitrobenzenesulfonate ion.

Specific examples of commercial products of the above thermal acid generator include: diazonium salts such as AMERICURE series (manufactured by American Can Company), ULTRASET series (manufactured by Adeka Corporation), and WPAG series (manufactured by Wako Pure Chemical Company); iodonium salts such as UVE series (manufactured by General Electric Company), FC series (manufactured by 3M), UV9310C (manufactured by GE Toshiba Silicones Ltd.), Photoinitiator 2074 (manufactured by Rhone-Poulenc), and WPI series (manufactured by Wako Pure Chemical Company); and sulfonium salts such as CYRACURE series (manufactured by Union Carbide Corporation), UVI series (manufactured by General Electric Company), FC series (manufactured by 3M), CD series (manufactured by Sartomer), Optomer SP series and Optmer CP series (manufactured by Adeka Corporation), San Aid SI series (manufactured by Sanshin Chemical Industry Co., Ltd.), CI series (manufactured by Nippon Soda Co., Ltd.), WPAG series (manufactured by Wako Pure Chemical Company), and CPI series (manufactured by San-Apro Ltd.).

These thermal acid generators may be used alone or in combination of two or more kinds thereof.

The above thermal acid generator is contained in an amount of 0.01 to 1,000 parts by mass, and preferably 0.1 to 500 parts by mass, relative to 100 parts by mass of the total of the silicone copolymer, the fluoropolyether group-containing compound, and, if present, the fluorine-containing oil (C), although there is no limitation on the amount thereof.

By using the above active energy ray cationic curing initiator, the compound containing a cationic species is excited by light to cause photodecomposition reaction, thereby initiating curing (crosslinking reaction) of a curable site (for example, cyclic ether) of the silicone copolymer and the fluoropolyether group-containing compound having the curable site.

Suitable examples of the above active energy ray cationic curing initiator include triphenylsulfonium hexafluoroantimonate, triphenylsulfonium phosphate, p-(phenylthio)phenyldiphenylsulfonium hexafluoroantimonate, p-(phenylthio)phenyldiphenylsulfonium hexafluorophosphate, 4-chlorophenyldiphenylsulfonium hexafluorophosphate, 4-chlorophenyldiphenylsulfonium hexafluoroantimonate, bis[4-(diphenylsulfonio)phenyl]sulfide bishexafluorophosphate, bis[4-(diphenylsulfonio)phenyl]sulfide bishexafluoroantimonate, (2,4-cyclopentadien-1-yl)[(1 -methylethyl)benzene]-Fe-hexafluorophosphate, and diaryliodonium hexafluoroantimonate.

Specific examples of commercial products of the above active energy ray cationic curing initiator preferably include diazonium salt, iodonium salt, and sulfonium salt products such as UVI-6950, UVI-6970, UVI-6974, and UVI-6990 (manufactured by Union Carbide Corporation); Adeca Optomer SP-150, SP-151, SP-170, and SP-172 (manufactured by ADEKA CORPORATION); Irgacure 250 (manufactured by Ciba Japan); CI-2481, CI-2624, CI-2639, and CI-2064 (manufactured by Nippon Soda Co., Ltd.); CD-1010, CD-1011, and CD-1012 (manufactured by Sartomer Company Inc.); DTS-102, DTS-103, NAT-103, NDS-103, TPS-103, MDS-103, MPI-103, and BBI-103 (manufactured by Midori Kagaku Co., Ltd.); PCI-061T, PCI-062T, PCI-020T, and PCI-022T (manufactured by Nippon Kayaku Co., Ltd.); CPI-100P, CPT-101A, and CPI-200K (manufactured by San-Apro Ltd.); San-Aid SI-60L, San-Aid SI-80L, San-Aid SI-100L, San-Aid ST-110L, San-Aid SI-145, San-Aid SI-150, San-Aid SI-160, and San-Aid SI-180L (manufactured by Sanshin Chemical Industry Co., Ltd.); and WPAG series (manufactured by Wako Pure Chemical Company).

These active energy ray cationic curing initiators may be used alone or in combination of two or more kinds thereof.

The above active energy ray radical curing initiator is contained in an amount of 0.01 to 1,000 parts by mass, and preferably 0.1 to 500 parts by mass, relative to 100 parts by mass of the total of the silicone copolymer, the fluoropolyether group-containing compound, and, if present, the fluorine-containing oil (C), although there is no limitation on the amount thereof.

The curable composition of the present disclosure may contain a solvent. As the above solvent, a fluorine-containing organic solvent and a fluorine-free organic solvent can be used.

Examples of such a fluorine-containing organic solvent include perfluorohexane, perfluorooctane, perfluorodimethyl cyclohexane, perfluorodecalin, perfluoroalkyl ethanol, perfluorobenzene, perfluorotoluene, perfluoroalkyl amine (for example, Fluorinert (trade name)), perfluoroalkyl ether, perfluorobutyl tetrahydrofuran, polyfluoroaliphatic hydrocarbons (ASAHIKLIN AC6000 (trade name)), hydrochlorofluorocarbons (for example, ASAHIKLIN AK-225 (trade name)), hydrofluoroether (for example, Novec (trade name), HFE-7100 (trade name)), 1,1,2,2,3,3,4-heptafluorocyclopentane, fluorine-containing alcohols, perfluoroalkyl bromide, perfluoroalkyl iodide, perfluoropolyether (for example, Krytox (trade name), Demnum (trade name), Fomblin (trade name)), 1,3-bistrifluoromethylbenzene, 2-(perfluoroalkyl)ethyl methacrylate, 2-(perfluoroalkyl)ethyl acrylate, perfluoroalkyl ethylene, chlorofluorocarbon 134a, and hexafluoropropene oligomers.

Examples of such a fluorine-free organic solvent include acetone, methyl isobutyl ketone, cyclohexanone, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether pentane, hexane, heptane, octane, dichloromethane, chloroform, carbon tetrachloride, dichloroethane, carbon disulfide, benzene, toluene, xylene, nitrobenzene, diethyl ether, dimethoxyethane, diglyme, triglyme, ethyl acetate, butyl acetate, dimethylformamide, dimethyl sulfoxide, 2-butanone, acetonitrile, benzonitrile, butanol, 1-propanol, 2-propanol, ethanol, methanol, and diacetone alcohol.

Among them, the solvent used in the curable composition of the present disclosure is preferably methyl isobutyl ketone, propylene glycol monomethyl ether, hexadecane, butyl acetate, acetone, 2-butanone, cyclohexanone, ethyl acetate, diacetone alcohol, or 2-propanol.

These solvents may be used alone or in combination of two or more kinds thereof.

Such a solvent is contained in an amount of 5 to 100,000 parts by mass, and preferably 5 to 50,000 parts by mass, relative to 100 parts by mass of the total of the silicone copolymer, the fluoropolyether group-containing compound, and, if present, the fluorine-containing oil (C).

The curable composition of the present disclosure may further contain antioxidants, thickening agents, leveling agents, antifoaming agents, antistatic agents, antifogging agents, ultraviolet absorbers, pigments, dyes, inorganic fine particles such as silica, fillers such as aluminum paste, talc, glass frit, and metal powder, and polymerization inhibitors such as butylated hydroxytoluene (BHT) and phenothiazine (PTZ), and the like.

Next, an article of the present disclosure will be described.

The present disclosure provides an article comprising a substrate and a layer (surface-treating layer) on a surface of the substrate, wherein the layer is formed from the curable composition of the present disclosure. The article can be produced, for example, as follows.

At first, a substrate is provided. The substrate usable in the present disclosure may be composed of any suitable material such as a glass, a resin (this may be a natural or synthetic resin such as a common plastic material, preferably a polycarbonate resin, a poly(meth)acrylate resin, a polyethylene terephthalate resin, a triacetyl cellulose resin, a polyimide resin, a modified (transparent) polyimide resin, a polycycloolefin resin, and a polyethylene naphthalate resin, and may be in the form of a plate, a film, or others), a metal (this may be a simple substance of a metal such as aluminum, copper, silver, or iron, or a complex such as an alloy or the like), a ceramic, a semiconductor (silicon, germanium, or the like), a fiber (a fabric, a non-woven fabric, or the like), a fur, a leather, a wood, a pottery, a stone, an architectural member, or the like.

For example, when the article to be produced is an optical member, the material constituting the surface of the substrate may be a material for an optical member, such as a glass or a transparent plastic. The substrate, according to its specific specifications or the like, may also have an insulating layer, an adhesive layer, a protecting layer, a decorated frame layer (I-CON), an atomizing film layer, a hard coating layer, a polarizing film, a phase difference film, an organic EL display module, a liquid crystal display module, or the like.

The shape of the substrate is not limited. The surface region of the substrate on which a surface-treating layer is to be formed may be at least part of the substrate surface, and may be suitably determined according to the application, specific specifications, and the like of an article to be produced.

Then, a film of the above curable composition of the present disclosure is formed on the surface of such a substrate, and this film is post-treated as necessary, thereby forming a surface-treating layer from the curable composition of the present disclosure.

The film of the curable composition of the present disclosure can be formed by applying the above curable composition on the surface of the substrate such that the composition coats the surface. The coating method is not limited. For example, a wet coating method can be used.

Examples of the wet coating method include dip coating, spin coating, flow coating, spray coating, roll coating, gravure coating, micro-gravure coating, bar coating, die coating, screen printing, and similar methods.

When using the wet coating method, the curable composition of the present disclosure can be applied to the substrate surface after being diluted with a solvent. As such a solvent, the fluorine-containing organic solvent and fluorine-free organic solvent described above can be used. From the viewpoint of the stability of the curable composition of the present disclosure and the volatility of the solvent, the following solvents are preferably used: perfluoroaliphatic hydrocarbons having 5 to 12 carbon atoms (for example, perfluorohexane, perfluoromethylcyclohexane, and perfluoro-1,3-dimethylcyclohexane); polyfluoroaromatic hydrocarbons (for example, bis(trifluoromethyl)benzene); polyfluoroaliphatic hydrocarbons; cellosolve solvents such as hydrofluoroethers (HFEs) (for example, alkyl perfluoroalkyl ethers such as perfluoropropyl methyl ether ($C_3F_7OCH_3$), perfluorobutyl methyl ether ($C_4F_9OCH_3$), perfluorobutyl ethyl ether ($C_4F_9OC_2H_5$), perfluorohexyl methyl ether ($C_2F_5CF(OCH_3)C_3F_7$) (the perfluoroalkyl group and the alkyl group may be linear or branched)), hydrochlorofluorocarbons (for example, ASAHIKLIN AK-225 (trade name)), methyl cellosolve, ethyl cellosolve, methyl cellosolve acetate, and ethyl cellosolve acetate; ester solvents such as diethyl oxalate, ethyl pyruvate, ethyl-2-hydroxybutyrate, ethyl acetoacetate, ethyl acetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate, and ethyl 2-hydroxyisobutyrate; propylene glycol solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, and dipropylene glycol dimethyl ether; ketone solvents such as acetone, methyl ethyl ketone, methyl isobutyl ketone, 2-hexanone, cyclohexanone, methyl amino ketone, and 2-heptanone; alcohol solvents such as methanol, ethanol, propanol, isopropanol, butanol, and diacetone alcohol; and aromatic hydrocarbons such as toluene and xylene. One of these solvents may be used singly, or two or more may be used as a mixture. Among them, hydrofluoroethers, glycol solvents, ester solvents, ketone solvents, and alcohol solvents are preferable, and perfluorobutyl methyl ether ($C_4F_9OCH_3$) and/or perfluorobutyl ethyl ether ($C_4F_9OC_2F_{15}$), propylene glycol monomethyl ether, ethyl acetate, butyl acetate, propylene glycol monomethyl ether acetate, methyl ethyl ketone, methyl isobutyl ketone, isopropanol, butanol, and diacetone alcohol are particularly preferable.

The film is then post-treated. This post-treatment is not limited, but is performed, for example, by irradiating with active energy rays, for example, electromagnetic waves in a wavelength region of 350 nm or less, such as ultraviolet rays, electron beams, X-rays, γ-rays, and the like. Alternatively, it is performed by heating for a predetermined time. By performing such a post-treatment, curing of a curable site of the silicone copolymer and the fluoropolyether group-containing compound having the curable site, and, if present, a curable site of the matrix-forming composition is initiated, and bonds are formed between these compounds and between these compounds and the substrate.

In the above-described manner, a surface-treating layer derived from the curable composition of the present disclosure is formed on the substrate surface, and the article of the present disclosure is produced. The surface-treating layer thus obtained has both high surface lubricity (or lubricity, such as wiping property for fouling including fingerprints and the like and excellent tactile sensations to the fingers) and high friction durability. Furthermore, this surface-treating layer may have not only high friction durability and surface lubricity, but also have, depending on the compositional features of the curable composition to be used, water-repellency, oil-repellency, antifouling property (for example, preventing grime such as fingerprints from adhering), and the like, and may be suitably used as a functional thin film.

The static friction coefficient of the film formed from the surface-treating composition of the present invention is preferably 1.3 or less, more preferably 1.1 or less, and still more preferably 1.0 or less.

The dynamic friction coefficient of the film formed from the surface-treating composition of the present invention is preferably 0.43 or less, more preferably 0.41 or less, and still more preferably 0.39 or less.

The above static friction coefficient and dynamic friction coefficient can be measured using a friction measuring machine (Tribomaster TL201 Ts, manufactured by Trinity-Lab Inc.) and the like with a tactile contactor as the friction block, a load of 20 gf, and a scanning speed of 10 mm/sec.

The present disclosure further relates to an optical material having the above surface-treating layer in the outermost layer.

The optical material preferably includes a wide variety of optical materials in addition to optical materials relating to displays and the like as exemplified below: for example, displays such as cathode ray tubes (CRTs; for example, TV, PC monitors), liquid crystal displays, plasma displays, organic EL displays, inorganic thin-film EL dot matrix displays, rear projection displays, vacuum fluorescent displays (VFDs), and field emission displays (FEDs); protective plates for such displays; and those obtained by performing an antireflection film treatment on films or their surfaces.

In one embodiment, the article having a surface-treating layer obtained according to the present disclosure may be, but is not limited to, an optical member. Examples of the optical member include lenses of glasses or the like; front surface protective plates, anti-scattering films, antireflection plates, polarizing plates, and anti-glare plates for displays such as PDPs and LCDs; touch panel sheets for devices such as mobile phones and personal digital assistants; disc surfaces of optical discs such as Blu-ray (registered trademark) discs, DVD discs, CD-Rs, and MOs; and optical fibers.

In one embodiment, examples of the article having a surface-treating layer obtained according to the present disclosure include a light detection and ranging (LiDAR) cover member, a sensor member, an instrument panel cover member, an automobile interior member, and the like, and in particular, these members for automobiles.

The thickness of the surface-treating layer is not limited. The thickness of the surface-treating layer in the case of an optical member is in the range of 0.1 to 30 μm, preferably 0.5 to 20 μm, from the viewpoint of optical performance, surface lubricity, friction durability, and antifouling property.

The article obtained by using the curable composition of the present disclosure has been described in detail above. The application of the curable composition of the present disclosure, the method for using the same, the method for producing an article, and the like are not limited to those exemplified above.

[1] A curable composition comprising a silicone copolymer, a fluoropolyether group-containing compound, and a matrix-forming composition, wherein the silicone copolymer has two or more crosslinkable groups; and the crosslinkable group is a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group, or a precursor group thereof.

[2] The curable composition according to [1], wherein the silicone copolymer has three or more crosslinkable groups.

[3] The curable composition according to [1] or [2], wherein the silicone copolymer is a chain copolymer.

[4] The curable composition according to [3], wherein the chain copolymer is an addition copolymer.

[5] The curable composition according to [4], wherein the addition copolymer is a radical copolymer or an ionic copolymer.

[6] The curable composition according to [4], wherein the addition copolymer is a radical copolymer.

[7] The curable composition according to any one of [1] to [6], wherein the silicone copolymer is a block copolymer.

[8] The curable composition according to any one of [1] to [7], wherein the silicone copolymer has a chain siloxane moiety.

[9] The curable composition according to any one of [1] to [8], wherein the silicone copolymer is a silicone copolymer represented by the following formula (1) or (2):

(1)

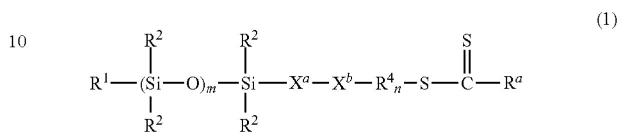

(2)

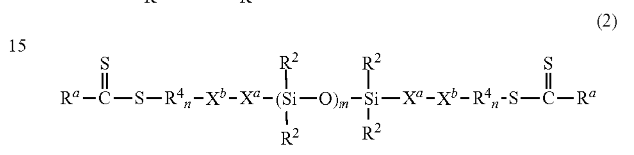

wherein $R^1$ is a hydrogen atom or a $C_{1-6}$ alkyl group;

$R^2$ is each independently at each occurrence a hydrogen atom or a $C_{1-6}$ alkyl group;

m is an integer of 1 to 300;

$R^4$ is each independently at each occurrence $R^{4a}$ or $R^{4b}$;

$R^{4a}$ is each independently at each occurrence a divalent organic group having a crosslinkable group;

$R^{4b}$ is each independently at each occurrence a divalent organic group not having a crosslinkable group;

the crosslinkable group is: a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group; or a group containing a precursor group thereof;

n is an integer of 1 to 90;

$X^a$ is each independently a divalent organic group;

$X^b$ is each independently a divalent organic group;

$R^a$ is each independently an alkyl, phenyl, —$SR^{a1}$, —$OR^{a2}$, —$NR^{a3}{}_2$,

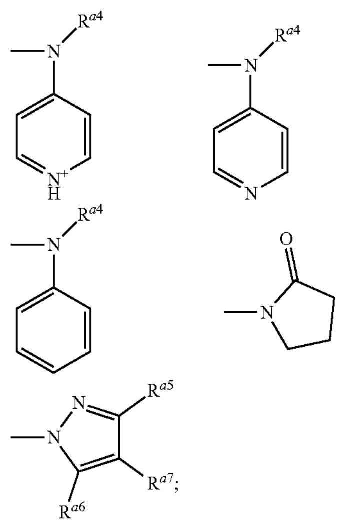

$R^{a1}$, $R^{a2}$, $R^{a3}$, $R^{a4}$, $R^{a5}$, and $R^{a6}$ are each independently an alkyl group or a phenyl group; and $R^{a7}$ is a hydrogen atom or a halogen atom.

[10] The curable composition according to any one of [1] to [9], wherein the silicone copolymer has three or more crosslinkable groups at an end thereof.

[11] The curable composition according to any one of [1] to [10], wherein the silicone copolymer is hydrophobic.

[12] The curable composition according to any one of [9] to [11], wherein $R^4$ is $R^{4a}$.

[13] The curable composition according to any one of [9] to [12], wherein $R^{4a}$ is a group represented by the following formula:

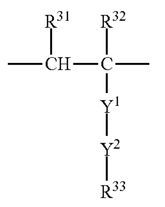

wherein $R^{31}$ is each independently at each occurrence a hydrogen atom or an alkyl group;

$R^{32}$ is each independently at each occurrence a hydrogen atom, a chlorine atom, a fluorine atom, or an alkyl group optionally substituted with fluorine;

$R^{33}$ is each independently at each occurrence a crosslinkable group;

$Y^1$ is a single bond, —C(═O)O—, —C(═O)NH—, —OC(═O)—, —NHC(═O)—, —O—, —N($R^c$)—, an aromatic ring, an aromatic ring having a substituent, or carbazolylene;

$R^c$ is an organic group; and $Y^2$ is a single bond or a linker having 1 to 16 atoms in a main chain thereof.

[14] The curable composition according to any one of [1] to [13], wherein the crosslinkable group is an epoxy group, a glycidyl group, an alicyclic epoxy group, a vinyl group, an allyl group, an optionally substituted acryloyl group, a cinnamoyl group, a 2,4-hexadienoyl group, a vinyl ether (vinyloxy) group, a hydroxyl group, an oxetanyl group, an isocyanate group, a catechol group, a thiol group, an amino group, an alkylamino group, a dialkylamino group, an azide group, a phosphoric acid-containing group, a carboxyl group, an imidazolyl group, a triazolyl group, a benzotriazolyl group, a tetrazolyl group, a halogen atom, or a silane coupling group, or a precursor group thereof.

[15] The curable composition according to any one of [1] to [14], wherein the crosslinkable group is an epoxy group, a glycidyl group, an alicyclic epoxy group, an acryloyl group, or a methacryloyl group.

[16] The curable composition according to any one of [9] to [15], wherein n is an integer of 2 to 50.

[17] The curable composition according to any one of [9] to [16], wherein n is an integer of 3 to 30.

[18] The curable composition according to any one of [9] to [17], wherein $R^2$ is each independently at each occurrence a $C_{1-6}$ alkyl group.

[19] The curable composition according to any one of [9] to [18], wherein m is an integer of 2 to 250.

[20] The curable composition according to any one of [1] to [19], wherein the fluoropolyether group-containing compound has a fluorine element ratio in the compound in the range of 2 to 70% by weight.

[21] The curable composition according to any one of [1] to [20], wherein the fluoropolyether group-containing compound has a fluorine element ratio in the compound in the range of 10 to 60% by weight.

[22] The curable composition according to any one of [1] to [21], wherein the fluoropolyether group-containing compound is a chain copolymer.

[23] The curable composition according to [22], wherein the chain copolymer is an addition copolymer.

[24] The curable composition according to [23], wherein the addition copolymer is a radical copolymer or an ionic copolymer.

[25] The curable composition according to [23], wherein the addition copolymer is a radical copolymer.

[26] The curable composition according to any one of [1] to [25], wherein the fluoropolyether group-containing compound is a block copolymer.

[27] The curable composition according to any one of [1] to [26], wherein the fluoropolyether group-containing compound is a fluoropolyether group-containing compound represented by any of the following formulas (3) to (5):

(3)

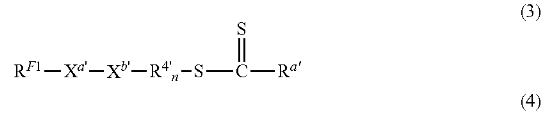

(4)

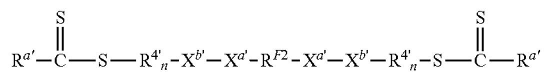

wherein $R^{F1}$ is $Rf^1—R^F—O_q—$;

$R^{F2}$ is $—Rf^2_p—R^F—O_q—$;

$R^{f1}$ is a $C_{1-16}$ alkyl group optionally substituted with one or more fluorine atoms;

$Rf^2$ is a $C_{1-6}$ alkylene group optionally substituted with one or more fluorine atoms;

$R^F$ is each independently a divalent fluoropolyether group;

p is 0 or 1;

q is each independently 0 or 1;

$R^{4'}$ is each independently at each occurrence $R^{4a'}$ or $R^{4b'}$;

$R^{4a'}$ is each independently at each occurrence a divalent organic group having a functional group selected from substituent group A;

$R^{4b'}$ is each independently at each occurrence a divalent organic group not having a functional group selected from substituent group A;

the substituent group A is: a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, and a silane coupling group; and a precursor group thereof;

n' is an integer of 1 to 100;

$X^{a'}$ is each independently a divalent organic group;

$X^{b'}$ is each independently a divalent organic group;

$R^{a'}$ is each independently an alkyl, phenyl, $—SR^{a1}$, $—OR^{a2}$, $—NR^{a3}_2$,

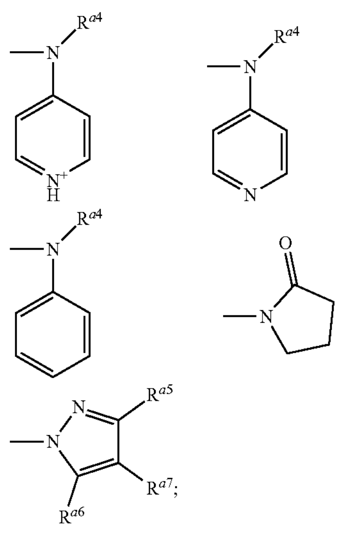

$R^{a1}$, $R^{a2}$, $R^{a3}$, $R^{a4}$, $R^{a5}$, and $R^{a6}$ are each independently an alkyl group or a phenyl group; and $R^{a7}$ is a hydrogen atom or a halogen atom.

[28] The curable composition according to [27], wherein $R^{4'}$ is $R^{4a'}$.

[29] The curable composition according to [27] or [28], wherein $R^{4a'}$ is a group represented by the following formula:

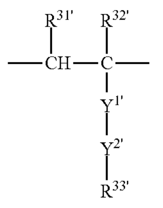

wherein $R^{31'}$ is each independently at each occurrence a hydrogen atom or an alkyl group;

$R^{32'}$ is each independently at each occurrence a hydrogen atom, a chlorine atom, a fluorine atom, or an alkyl group optionally substituted with fluorine;

$R^{33'}$ is each independently at each occurrence a crosslinkable group;

$Y^{1'}$ is a single bond, —C(═O)O—, —C(═O)NH—, —OC(═O)—, —NHC(═O)—, —O—, —N($R^c$)—, phenylene, or carbazolylene;

$R^c$ is an organic group; and $Y^{2'}$ is a single bond or a linker having 1 to 16 atoms in a main chain thereof.

[30] The curable composition according to any one of [27] to [29], wherein the functional group selected from the substituent group A is an epoxy group, an alicyclic epoxy group, a glycidyl group, or $CH_2$═$CX^{1'}$—C(O)—, wherein $X^{1'}$ represents a hydrogen atom, a chlorine atom, a fluorine atom, or an alkyl group having 1 to 10 carbon atoms optionally substituted with fluorine.

[31] The curable composition according to any one of [27] to [30], wherein n' is an integer of 2 to 50.

[32] The curable composition according to any one of [27] to [31], wherein n' is an integer of 3 to 30.

[33] The curable composition according to any one of [27] to [32], wherein the silicone copolymer is a silicone copolymer represented by the formula (1) or (2) and the fluoropolyether group-containing compound is a fluoropolyether group-containing compound represented by the formula (3) or (4).

[34] The curable composition according to any one of [1] to [25], wherein the fluoropolyether group-containing compound is a fluoropolyether group-containing compound represented by the following formula (5):

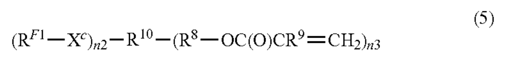

(5)

wherein $R^{F1}$ is $Rf^1$—$R^F$—$O_q$—;

$Rf^1$ is a $C_{1-16}$ alkyl group optionally substituted with one or more fluorine atoms;

$R^F$ is each independently a divalent fluoropolyether group;

q is 0 or 1;

$X^c$ is a group represented by the following formula:

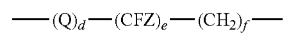

wherein Q represents an oxygen atom, phenylene, carbazolylene, —$NR^a$—, wherein $R^a$ represents a hydrogen atom or an organic group, or a divalent polar group;

Z represents a hydrogen atom, a fluorine atom, or a lower fluoroalkyl group; and d, e, and f are each independently an integer of 0 to 50, the sum of d, e, and f is at least 1, and the occurrence order of the respective repeating units enclosed in parentheses is not limited in the formula;

$R^{10}$ represents an organic group having a valence of (n2+n3) that optionally has a ring structure, a heteroatom, and/or a functional group;

$R^8$ represents a divalent organic group;

$R^9$ represents a hydrogen atom, a chlorine atom, a fluorine atom, or an alkyl group having 1 to 10 carbon atoms optionally substituted with fluorine;

n2 is an integer of 1 to 3; and n3 is an integer of 1 to 3.

[35] The curable composition according to any one of [27] to [34], wherein $R^F$ is each independently a group represented by the formula:

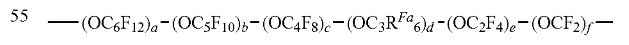

wherein $R^{Fa}$ is each independently at each occurrence a hydrogen atom, a fluorine atom, or a chlorine atom; and a, b, c, d, e, and f are each independently an integer of 0 to 200, the sum of a, b, c, d, e, and f is 1 or more, and the occurrence order of the respective repeating units enclosed in parentheses provided with a, b, c, d, e, or f is not limited in the formula.

[36] The curable composition according to [35], wherein $R^{Fa}$ is a fluorine atom.

[37] The curable composition according to any one of [27] to [36], wherein $R^F$ is each independently a group represented by the following formula (f1), (f2), (f3), (f4), or (f5):

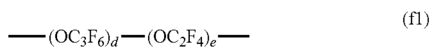

(f1)

wherein d is an integer of 1 to 200 and e is 0 or 1;

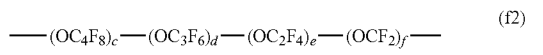

(f2)

wherein c and d are each independently an integer of 0 to 30;

e and f are each independently an integer of 1 to 200;

the sum of c, d, e, and f is an integer of 10 to 200; and the occurrence order of the respective repeating units enclosed in parentheses provided with the subscript c, d, e, or f is not limited in the formula;

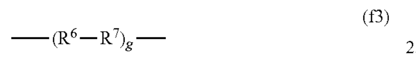

(f3)

wherein $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or is a combination of two or three groups selected from these groups; and g is an integer of 2 to 100;

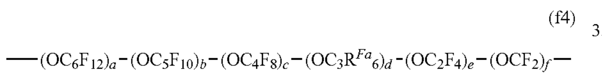

(f4)

wherein e is an integer of 1 or more and 200 or less, a, b, c, d, and f are each independently an integer of 0 or more and 200 or less, the sum of a, b, c, d, e, and f is at least 1, and the occurrence order of the respective repeating units enclosed in parentheses provided with a, b, c, d, e, or f is not limited in the formula; or

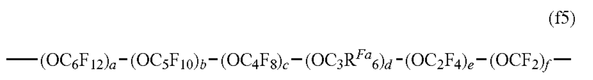

(f5)

wherein f is an integer of 1 or more and 200 or less, a, b, c, d, and e are each independently an integer of 0 or more and 200 or less, the sum of a, b, c, d, e, and f is at least 1, and the occurrence order of the respective repeating units enclosed in parentheses provided with a, b, c, d, e, or f is not limited in the formula.

[38] The curable composition according to any one of [27] to [37], further comprising at least one fluorine-containing oil represented by the following general formula (C):

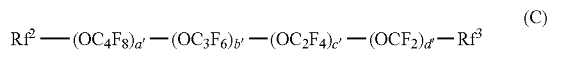

(C)

wherein $Rf^2$ is an alkyl group having 1 to 16 carbon atoms optionally substituted with one or more fluorine atoms;

$Rf^3$ is a hydrogen atom, a fluorine atom, or an alkyl group having 1 to 16 carbon atoms optionally substituted with one or more fluorine atoms;

in the above formula (C), a', b', c', and d' respectively represent the numbers of three repeating units of perfluoro (poly)ethers constituting the main backbone of the polymer and are each independently an integer of 0 or more and 300 or less;

the sum of a', b', c', and d' is at least 1; and the occurrence order of the respective repeating units enclosed in parentheses provided with the subscript a', b', c', or d' is not limited in the formula.

[39] The curable composition according to any one of [1] to [38], wherein the curable composition has a mass ratio between the silicone copolymer and the fluoropolyether group-containing compound in the range of 0.1:100 to 100:0.1.

[40] The curable composition according to any one of [1] to [39], wherein the curable composition has a mass ratio between the silicone copolymer and the fluoropolyether group-containing compound in the range of 0.5:100 to 100:100.

[41] A film formed from the curable composition according to any one of [1] to [40].

[42] An article comprising a substrate and a layer on a surface of the substrate, wherein the layer is formed from the curable composition according to any one of [1] to [40].

[43] The article according to [42], which is an optical member.

[44] The article according to [42], which is a LiDAR cover member.

[45] The article according to [42], which is a sensor member.

[46] The article according to [42], which is an instrument panel cover member.

[47] The article according to [42], which is an automobile interior member.

EXAMPLES

Hereinafter, the present disclosure will be described by way of Examples, but the present disclosure is not intended to be limited to the following Examples. In the Examples, all chemical formulas shown below indicate average compositional features, and the occurrence order of repeating units (such as $(OCF_2CF_2CF_2)$, $(OCF_2CF_2)$, and $(OCF_2)$) constituting perfluoropolyether is not limited.

1. Synthesis of Silicone-Containing Chain Transfer Agents

(1) Synthesis of Chain Transfer Agent (A-1)

To a flask were added 0.895 g of 2-[(dodecylsulfanylthiocarbonyl)sulfanyl] propanoic acid (manufactured by FUJIFILM Wako Pure Chemical Corporation), 0.031 g of 4-dimethylaminopyridine (DMAP) (manufactured by Tokyo Chemical Industry Co., Ltd.), 0.489 g of 1-ethyl-3-(3-dimethylaminopropyl) carbodiimide hydrochloride (EDCI) (manufactured by Tokyo Chemical Industry Co., Ltd.), and 10.0 g of single-end type carbinol-modified silicone X-22-170DX (number average molecular weight 4,700, manufactured by Shin-Etsu Chemical Co., Ltd.), 15 mL of dichloromethane was added, and the mixture was stirred at room temperature to conduct the reaction. After stirring overnight, the reaction solution was washed with saturated aqueous sodium bicarbonate and brine. The organic layer was separated, concentrated, and dropped into methanol to give 9.49 g of a yellow oily target product (A-1) formed by dehydration condensation of 2-[(dodecylsulfanylthiocarbonyl)sulfanyl] propanoic acid and single-end type carbinol-modified silicone X-22-170DX.

Synthesis of Silicone-Containing Chain Transfer Agent (A-2)

19.5 g of a yellow oily target product (A-2) was obtained by synthesis in the same manner as (A-1), except that X-22-170DX was changed to 21.3 g of a single-end type carbinol-modified silicone FM-0425 (number average molecular weight 10,000, manufactured by JNC Corporation).

2. Synthesis of Silicone Copolymers Having an Epoxy Group (S-1) to (S-3)

Into a reaction vessel were added 1.0 g of the chain transfer agent (A-1), 0.16 g of 4-hydroxybutyl acrylate glycidyl ether (4HBAGE) (manufactured by Mitsubishi Chemical Corporation), and 11 mg of N,N'-azobisisisobutyronitrile (AIBN) (manufactured by FUJIFILM Wako Pure Chemical Corporation), and the mixture was dissolved in 2.3 mL of toluene. The mixture was heated at 75° C. for 16 hours, and the reaction solution was dropped into methanol to precipitate and recover a block polymer (S-1). From $^{1}$H-NMR measurements, the polymerization degree of 4HBAGE was calculated to be 3.

In the same manner as the above synthesis of (S-1), block polymers (S-2) and (S-3), in which the polymerization degree was 5 and 20, were synthesized by changing the charging amount of 4HBAGE to 0.27 g and 1.07 g, respectively.

Synthesis of Silicone Copolymer Having an Epoxy Group (S-4)

In the same manner as (S-1), a block polymer (S-4), in which the polymerization degree of 4HBAGE was 10, was obtained, except that 1.0 g of the chain transfer agent (A-1) was changed to (A-2), 0.16 g of 4HBAGE was changed to 0.2 g, and AIBN was changed to 5.5 mg.

3. Synthesis of Silicone Copolymers Having a (Meth) Acrylic Group (1) Synthesis of Silicone Copolymers Having an Acrylic Group (S-8) to (S-10)

Into a reaction vessel were added 1.0 g of the chain transfer agent (A-1), 0.08 g of 2-hydroxyethyl acrylate (HEA) (manufactured by Tokyo Chemical Industry Co., Ltd.), and 10 mg of AIBN, and the mixture was dissolved in 2.9 mL of toluene. Polymerization was carried out by heating at 70° C. for 22.5 hours to obtain a solution of a block polymer (S-5). From $^{1}$H-NMR measurements, the polymerization degree of HEA was calculated to be 3.

In the same manner as described above, block polymers (S-6) and (S-7), in which the polymerization degree was 5 and 20, were synthesized by changing the charging amount of HEA to 0.14 g and 0.53 g, respectively.

To the block polymer (S-5) solution obtained as described above were added 1.1 equivalents of 2-isocyanatoethyl acrylate (trade name: Karenz AOI, manufactured by Showa Denko K.K.) and 0.01 equivalents of dibutyltin dilaurate (DBTDL) (manufactured by Tokyo Chemical Industry Co., Ltd.) relative to the HEA unit in the polymer (S-5), and the mixture was stirred at 40° C. for 2 hours. After it was confirmed by $^{1}$H-NMR measurement that 100% of the hydroxyl groups had reacted, the reacted solution was dropped into methanol to precipitate and recover a block polymer having an acrylic group (S-8). The same reaction was carried out for the block polymers (S-6) and (S-7) to synthesize block polymers (S-9) and (S-10), in which the polymerization degree was 5 and 20, respectively.

(2) Synthesis of Silicone Copolymers Having a Methacrylic Group (S-11) to (S-13)

In the same manner as the above synthesis of (S-8) to (S-10), block polymers having a methacrylic group (S-11) to (S-13), in which the polymerization degree was 3, 5, and 20, respectively, were synthesized, except that Karenz AOI was changed to 2-isocyanatoethyl methacrylate (trade name: Karenz MOI, manufactured by Showa Denko K.K.).

4. Synthesis of Perfluoropolyether-Containing Chain Transfer Agents (1) Synthesis of Chain Transfer Agent (B-1)

To a flask were added 0.505 g of 2-[(dodecylsulfanylthiocarbonyl)sulfanyl] propanoic acid (manufactured by FUJIFILM Wako Pure Chemical Corporation), 0.019 g of 4-dimethylaminopyridine (DMAP) (manufactured by Tokyo Chemical Industry Co., Ltd.), 0.293 g of 1-ethyl-3-(3-dimethylaminopropyl) carbodiimide hydrochloride (EDCI) (manufactured by Tokyo Chemical Industry Co., Ltd.), and 5.0 g of an alcohol containing perfluoropolyether represented by $CF_3CF_2CF_2(OCF_2CF_2CF_2)_nOCF_2CF_2CH_2OH$ (average value of n≈25) (manufactured by Daikin Industries, Ltd.), 13 mL of ASAHIKLIN AK-225 (manufactured by AGC) was added, and the mixture was stirred at room temperature to conduct the reaction. After stirring overnight, the reaction solution was washed with saturated aqueous sodium bicarbonate and brine. The organic layer was separated, concentrated, and dropped into methanol to give 4.56 g of a yellow oily target product (B-1) formed by dehydration condensation of 2-[(dodecylsulfanylthiocarbonyl)sulfanyl] propanoic acid and the alcohol containing perfluoropolyether. The structure of the compound was confirmed by $^{1}$H and $^{19}$F NMR measurements.

(2) Synthesis of Chain Transfer Agent (B-2)

In the same manner as the above synthesis of (B-1), 4.27 g of the target product (B-2) was obtained, except that 2-[(dodecylsulfanylthiocarbonyl)sulfanyl] propanoic acid was changed to 0.421 g, DMAP to 0.015 g, and EDCI to 0.230 g, and 4.2 g of $CF_3CF_2\ (OCF_2)_m\ (OCF_2CF_2)_n\ OCF_2CH_2OH$ (number average molecular weight 4200, n/m=1.1) was used as the alcohol containing perfluoropolyether.

(3) Synthesis of Chain Transfer Agent (B-3)

In the same manner as the above synthesis of (B-1), 4.68 g of the target product (B-3) was obtained, except that 5.0 g of $CF_3CF_2CF_2[OCF(CF_3)CF_2]_nOCF(CF_3)CH_2OH$ (n≈25) was used as the alcohol containing perfluoropolyether.

5. Synthesis of PFPE Copolymers Having an Epoxy Group (1) Synthesis of PFPE Copolymer Having an Epoxy Group (F-1)

Into a reaction vessel were added 1.0 g of the chain transfer agent (B-1), 0.23 g of 4-hydroxybutyl acrylate glycidyl ether (4HBAGE) (manufactured by Mitsubishi Chemical Corporation), and 12 mg of N,N'-azobisisisobutyronitrile (AIBN) (manufactured by FUJIFILM Wako Pure Chemical Corporation), and the mixture was dissolved in 2.9 mL of 1,3-bis(trifluoromethyl)benzene (manufactured by Tokyo Chemical Industry Co., Ltd.). The mixture was heated at 75° C. for 17 hours, and the reaction solution was dropped into hexane to precipitate and recover a block polymer (F-1). From $^{1}$H-NMR measurements, the polymerization degree of 4HBAGE was calculated to be 5.

(2) Synthesis of PFPE Copolymer Having an Epoxy Group (F-2)

In the same manner as the above synthesis of (F-1), a block polymer (F-2) was obtained, except that 1.0 g of the chain transfer agent (B-1) was changed to 1.0 g of the chain transfer agent (B-2). From $^{1}$H-NMR measurements, the polymerization degree of 4HBAGE was calculated to be 5.

(3) Synthesis of PFPE Copolymer Having an Epoxy Group (F-3)

In the same manner as the above synthesis of (F-1), a block polymer (F-3) was obtained, except that 1.0 g of the chain transfer agent (B-1) was changed to 1.0 g of the chain transfer agent (B-3). From $^1$H-NMR measurements, the polymerization degree of 4HBAGE was calculated to be 5.

6. Synthesis of PFPE Copolymers Having a (Meth)Acrylic Group (1) Synthesis of PFPE Copolymer Having an Acrylic Group (F-5)

Into a reaction vessel were added 1.3 g of the chain transfer agent (B-1), 0.18 g of 2-hydroxyethyl acrylate (HEA) (manufactured by Tokyo Chemical Industry Co., Ltd.), and 15.5 mg of AIBN, and the mixture was dissolved in 2.1 mL of 1,3-bis (trifluoromethyl)benzene. Polymerization was carried out by heating at 70° C. for 22.5 hours to obtain a solution of a block polymer (F-4). From $^1$H-NMR measurements, the polymerization degree of HEA was calculated to be 5.

Subsequently, to the block polymer (F-4) solution obtained as described above were added 1.1 equivalents of Karenz AOI (manufactured by Showa Denko K.K.) and 0.01 equivalents of dibutyltin dilaurate (DBTDL) (manufactured by Tokyo Chemical Industry Co., Ltd.) relative to the HEA unit in the polymer (F-4), and the mixture was stirred at 40° C. for 2 hours. After it was confirmed by $^1$H-NMR measurement that 100% of the hydroxyl groups had reacted, the reacted solution was dropped into hexane to precipitate and recover a block polymer having an acrylic group (F-5).

(2) Synthesis of PFPE Copolymer Having a Methacrylic Group (F-6)

In the same manner as the above synthesis of (F-5), a block polymer having a methacrylic group (F-6) was synthesized, except that Karenz AOI was changed to Karenz MOI (manufactured by Showa Denko K.K.).

(3) Synthesis of PFPE Compound Having an Acrylic Group (F-7)

In a 1 L four-neck flask equipped with a dropping funnel, a condenser, a thermometer, and a stirrer, Sumidur (registered trademark) N3300 (manufactured by Sumika Bayer Urethane Co., Ltd., NCO group content: 21.8%, 36.6 g) was dissolved in HCFC225 (219.4 g), dibutyltin dilaurate (manufactured by FUJIFILM Wako Pure Chemical Corporation, 0.30 g) was added, a solution in which an alcohol (60.0 g) containing perfluoropolyether represented by the average compositional features: $CF_3CF_2CF_2O(CF_2CF_2CF_2O)_{14}CF_2CF_2CH_2OH$ was dissolved in HCFC225 (60.0 g) was added dropwise while stirring at 40° C. under nitrogen gas stream, and the mixture was stirred. Hydroxyethyl acrylate (19.6 g) was added dropwise and the mixture was stirred. With IR, it was confirmed that absorption of NCO was completely eliminated. 0.05 g of dibutylhydroxytoluene was added and HCFC 225 was completely removed, and a PFPE compound having an acrylic group (F-7) was synthesized.

7. Coating Film Preparation (1) Epoxy Coatings

CELLOXIDE 2021P (manufactured by Daicel Corporation) was dissolved in MIBK as a matrix-forming epoxy compound, and the PFPE copolymers (F-1) to (F-3) were added to the solution so that the concentration of the PFPE copolymers relative to the solids of the epoxy compound was 1% in terms of the solid content respectively. Furthermore, the silicone copolymers (S-1) to (S-4) were added in the combinations shown in the table below so that the concentration of the silicone copolymers relative to the solids of the epoxy compound was 0.1% in terms of the solid content respectively, thereby preparing epoxy compound solutions of 50% by mass. Furthermore, a thermal acid generator, San-Aid SI-60L (manufactured by Sanshin Chemical Industry Co., Ltd.) was added in an amount of 3% by mass relative to the solids of the epoxy compound to obtain coating agents. A PET substrate was coated with the coating agents using a bar coater and heated at 90° C. for 2 hours to obtain cured films.

(2) Acrylic Coatings

BEAMSET 575CB (manufactured by Arakawa Chemical Industries, Ltd.) was dissolved in MIBK as a composition comprising a matrix-forming acrylic compound, and the PFPE copolymer (F-5) or (F-6) was added to the solution so that the concentration of the PFPE copolymer relative to the resin solids of BEAMSET 575CB was 1% in terms of the solid content respectively. Furthermore, the silicone copolymers (S-8) to (S-13) were added in the combinations shown in the table below so that the concentration of the silicone copolymers relative to the resin solids of BEAMSET 575CB was 0.1% in terms of the solid content respectively, thereby obtaining coating compositions of 50% by mass. A PET substrate was coated with the coating compositions using a bar coater, dried under conditions of 70° C. for 10 minutes, and irradiated with ultraviolet rays to obtain cured films. A belt conveyor type ultraviolet irradiation device was used for the ultraviolet irradiation, and the dose was set to 600 mJ/cm$^2$. When (F-7) was used as the PFPE compound, propylene glycol monomethyl ether was used as the solvent instead of MIBK, and the same treatment was performed to obtain a cured film.

(3) Acrylic Coating (Containing End Type Carbinol-Modified Silicone)

A cured film was obtained in the same manner as the above (2), except that a single-end type carbinol-modified silicone X-22-170DX was added instead of the silicone copolymer.

(4) Epoxy and Acrylic Coatings (with No Silicone Copolymer or PFPE Copolymer)

Cured films were obtained in the same manner as the above (1) or (2), except that the addition of the silicone copolymer and the PFPE copolymer was not performed.

8. Presence or Absence of Bleedout Components from Cured Films

After touching the cured films prepared in the above 7 with a finger, whether whitening due to bleedout components could be seen on the film surface was visually checked. The evaluation criteria are as follows.

Good: no whitening.

Poor: whitened.

9. Surface Lubricity Evaluation

For the cured films prepared in the above 7, the static friction coefficient and dynamic friction coefficient were measured using a friction measuring machine (Tribomaster TL201 Ts, manufactured by Trinity-Lab Inc.) with a tactile contactor as the friction block, a load of 20 gf, and a scanning speed of 10 mm/sec.

10. Contact Angle Evaluation

For the cured films prepared in the above 7, the static contact angle of water was measured using 2 μL of liquid using a contact angle meter ("DropMaster" manufactured by Kyowa Interface Science Co., Ltd.).

The results of the above evaluations are shown in Table 1 below.

TABLE 1

| Example | Silicone copolymer | Polymerization moiety | Polymerization degree | PFPE copolymer | Hard coat agent | Bleed out | Static friction coefficient | Dynamic friction coefficient | Water contact angle (°) |
|---|---|---|---|---|---|---|---|---|---|
| 1 | S-1 | 4HBAGE | 3 | F-1 | Epoxy | Good | 0.281 | 0.165 | 102 |
| 2 | S-2 | 4HBAGE | 5 | F-1 | Epoxy | Good | 0.277 | 0.183 | 103 |
| 3 | S-3 | 4HBAGE | 20 | F-1 | Epoxy | Good | 0.28 | 0.192 | 101 |
| 4 | S-3 | 4HBAGE | 20 | F-2 | Epoxy | Good | 0.289 | 0.196 | 103 |
| 5 | S-3 | 4HBAGE | 20 | F-3 | Epoxy | Good | 0.284 | 0.188 | 103 |
| 6 | S-4 | 4HBAGE | 10 | F-1 | Epoxy | Good | 0.280 | 0.182 | 106 |
| 7 | S-8 | AOI-modified HEA | 3 | F-5 | Acrylic | Good | 0.265 | 0.191 | 100 |
| 8 | S-9 | AOI-modified HEA | 5 | F-5 | Acrylic | Good | 0.288 | 0.188 | 103 |
| 9 | S-10 | AOI-modified HEA | 20 | F-5 | Acrylic | Good | 0.293 | 0.189 | 100 |
| 10 | S-11 | MOI-modified HEA | 3 | F-6 | Acrylic | Good | 0.272 | 0.181 | 102 |
| 11 | S-12 | MOI-modified HEA | 5 | F-6 | Acrylic | Good | 0.294 | 0.194 | 102 |
| 12 | S-13 | MOI-modified HEA | 20 | F-6 | Acrylic | Good | 0.293 | 0.189 | 101 |
| 13 | S-11 | MOI-modified HEA | 3 | F-7 | Acrylic | Good | 0.286 | 0.198 | 100 |
| 14 | S-12 | MOI-modified HEA | 5 | F-7 | Acrylic | Good | 0.296 | 0.188 | 101 |
| 15 | S-13 | MOI-modified HEA | 20 | F-7 | Acrylic | Good | 0.294 | 0.201 | 100 |
| Comparative Example | | | | | Acrylic | | | | |
| 1 | — | — | — | F-7 | Acrylic | Good | 1.522 | 0.598 | 109 |
| 2 | — | — | — | F-7 | Epoxy | Good | 1.345 | 0.626 | 107 |
| 3 | X-22-170DX | — | — | F-5 | Acrylic | Poor | 0.295 | 0.178 | 100 |
| 4 | — | — | — | — | Acrylic | Good | 1.478 | 0.393 | 62 |
| 5 | — | — | — | — | Epoxy | Good | 1.608 | 0.449 | 84 |

From the above results, it was confirmed that Examples 1 to 15, which fall within the scope of the present invention, have low static and dynamic friction coefficients of the films, high water contact angles, and no bleedout. On the other hand, in Comparative Examples 1 to 5, which are not included in the scope of the present disclosure, at least one of the static friction coefficient, dynamic friction coefficient, water contact angle, and bleedout property was found to be inferior.

INDUSTRIAL APPLICABILITY

The curable composition of the present disclosure can be suitably utilized to form a surface-treating layer on the surface of a large variety of substrates.

What is claimed is:

1. A curable composition comprising a silicone copolymer, a fluoropolyether group-containing compound, and a matrix-forming composition, wherein the silicone copolymer has two or more crosslinkable groups;

the crosslinkable group is a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group, or a precursor group thereof, wherein the silicone copolymer is a silicone copolymer represented by the following formula (1) or (2):

(1)

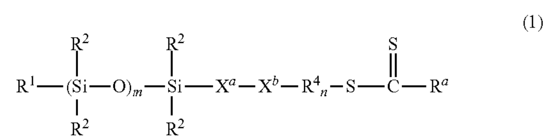

(2)

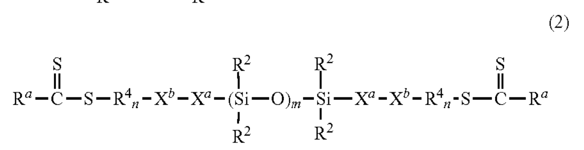

wherein $R^1$ is a hydrogen atom or a $C_{1-6}$ alkyl group;

$R^2$ is each independently at each occurrence a hydrogen atom or a $C_{1-6}$ alkyl group;

m is an integer of 1 to 300;

$R^4$ is each independently at each occurrence $R^{4a}$ or $R^{4b}$;

In $R^4{}_n$, the number of $R^{4a}$ is two or more;

$R^{4a}$ is each independently at each occurrence a divalent organic group having a crosslinkable group;

$R^{4b}$ is each independently at each occurrence a divalent organic group not having a crosslinkable group;

the crosslinkable group is: a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, or a silane coupling group; or a group containing a precursor group thereof;

n is an integer of 2 to 90;

$X^a$ is each independently a divalent organic group;

$X^b$ is each independently a divalent organic group;

$R^a$ is each independently an alkyl, phenyl, —$SR^{a1}$, —$OR^{a2}$, —$NR^{a3}{}_2$,

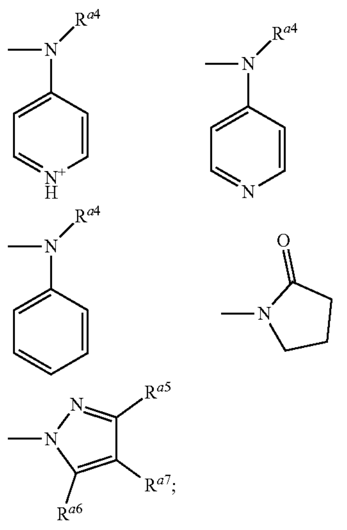

$R^{a1}$, $R^{a2}$, $R^{a3}$, $R^{a4}$, $R^{a5}$, and $R^{a6}$ are each independently an alkyl group or a phenyl group; and $R^{a7}$ is a hydrogen atom or a halogen atom.

2. The curable composition according to claim 1, wherein the silicone copolymer has three or more crosslinkable groups.

3. The curable composition according to claim 1, wherein the silicone copolymer is a chain copolymer.

4. The curable composition according to claim 3, wherein the chain copolymer is an addition copolymer.

5. The curable composition according to claim 4, wherein the addition copolymer is a radical copolymer or an ionic copolymer.

6. The curable composition according to claim 4, wherein the addition copolymer is a radical copolymer.

7. The curable composition according to claim 1, wherein the silicone copolymer is a block copolymer.

8. The curable composition according to claim 1, wherein the silicone copolymer has a chain siloxane moiety.

9. The curable composition according to claim 1, wherein the silicone copolymer has three or more crosslinkable groups at an end thereof.

10. The curable composition according to claim 1, wherein the silicone copolymer is hydrophobic.

11. The curable composition according to claim 1, wherein $R^4$ is $R^{4a}$.

12. The curable composition according to claim 1 wherein $R^{4a}$ is a group represented by the following formula:

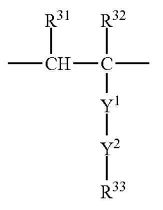

wherein $R^{31}$ is each independently at each occurrence a hydrogen atom or an alkyl group;

$R^{32}$ is each independently at each occurrence a hydrogen atom, a chlorine atom, a fluorine atom, or an alkyl group optionally substituted with fluorine;

$R^{33}$ is each independently at each occurrence a crosslinkable group;

$Y^1$ is a single bond

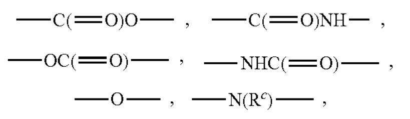

an aromatic ring, an aromatic ring having a substituent, or carbazolylene;

$R^e$ is an organic group; and $Y^2$ is a single bond or a linker having 1 to 16 atoms in a main chain thereof.

13. The curable composition according to claim 1, wherein the crosslinkable group is an epoxy group, a glycidyl group, an alicyclic epoxy group, a vinyl group, an allyl group, an optionally substituted acryloyl group, a cinnamoyl group, a 2,4-hexadienoyl group, a vinyl ether (vinyloxy) group, a hydroxyl group, an oxetanyl group, an isocyanate group, a catechol group, a thiol group, an amino group, an alkylamino group, a dialkylamino group, an azide group, a phosphoric acid-containing group, a carboxyl group, an imidazolyl group, a triazolyl group, a benzotriazolyl group, a tetrazolyl group, a halogen atom, or a silane coupling group, or a precursor group thereof.

14. The curable composition according to claim 1, wherein the crosslinkable group is an epoxy group, a glycidyl group, an alicyclic epoxy group, an acryloyl group, or a methacryloyl group.

15. The curable composition according to claim 1, wherein n is an integer of 2 to 50.

16. The curable composition according to claim 1, wherein n is an integer of 3 to 30.

17. The curable composition according to claim 1, wherein $R^2$ is each independently at each occurrence a $C_{1-6}$ alkyl group.

18. The curable composition according to claim 1, wherein m is an integer of 2 to 250.

19. The curable composition according to claim 1, wherein the fluoropolyether group-containing compound has a fluorine element ratio in the compound in the range of 2 to 70% by weight.

20. The curable composition according to claim 1, wherein the fluoropolyether group-containing compound has a fluorine element ratio in the compound in the range of 10 to 60% by weight.

21. The curable composition according to claim 1, wherein the fluoropolyether group-containing compound is a chain copolymer.

22. The curable composition according to claim 21, wherein the chain copolymer is an addition copolymer.

23. The curable composition according to claim 22, wherein the addition copolymer is a radical copolymer or an ionic copolymer.

24. The curable composition according to claim 22, wherein the addition copolymer is a radical copolymer.

25. The curable composition according to claim 1, wherein the fluoropolyether group-containing compound is a block copolymer.

26. The curable composition according to claim 1, wherein the fluoropolyether group-containing compound is a fluoropolyether group-containing compound represented by the following formula (3) or (4):

(3)

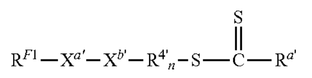

(4)

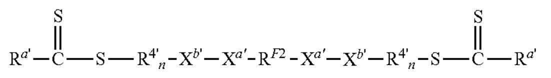

wherein $R^{F1}$ is $Rf^1—R^F—O_q—$;

$R^{F2}$ is $—Rf^2_p—R^F—O_q—$;

$Rf^1$ is a $C_{1-16}$ alkyl group optionally substituted with one or more fluorine atoms;

$Rf^2$ is a $C_{1-6}$ alkylene group optionally substituted with one or more fluorine atoms;

$R^F$ is each independently a divalent fluoropolyether group;

p is 0 or 1;

q is each independently 0 or 1;

$R^{4'}$ is each independently at each occurrence $R^{4a'}$ or $R^{4b'}$,

In $R^{4'}_{n'}$, the number of $R^{4a'}$ is two or more;

$R^{4a'}$ is each independently at each occurrence a divalent organic group having a functional group selected from substituent group A;

$R^{4b'}$ is each independently at each occurrence a divalent organic group not having a functional group selected from substituent group A;

the substituent group A is: a group containing a carbon-carbon double bond, a carbon-carbon triple bond, a cyclic ether group, a hydroxyl group, a thiol group, an amino group, an azide group, a nitrogen-containing heterocyclic group, an isocyanate group, a halogen atom, a phosphoric acid-containing group, and a silane coupling group; and a precursor group thereof;

n' is an integer of 1 to 100;

$X^{a'}$ is each independently a divalent organic group;

$X^{b'}$ is each independently a divalent organic group;

$R^{a'}$ is each independently an alkyl, phenyl, $—SR^{a1}$, $—OR^{a2}$, $—NR^{a3}_2$,

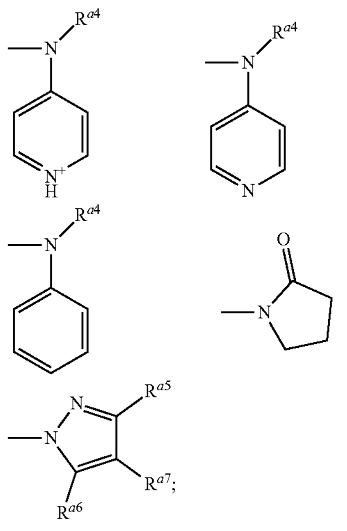

$R^{a1}$, $R^{a2}$, $R^{a3}$, $R^{a4}$, $R^{a5}$, and $R^{a6}$ are each independently an alkyl group or a phenyl group; and $R^{a7}$ is a hydrogen atom or a halogen atom.

27. The curable composition according to claim 26, wherein $R^{4'}$ is $R^{4a'}$.

28. The curable composition according to claim 26, wherein $R^{4a'}$ is a group represented by the following formula:

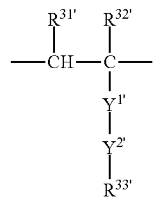

wherein $R^{31'}$ is each independently at each occurrence a hydrogen atom or an alkyl group;

$R^{32'}$ is each independently at each occurrence a hydrogen atom, a chlorine atom, a fluorine atom, or an alkyl group optionally substituted with fluorine;

$R^{33'}$ is each independently at each occurrence an organic group not having a functional group selected from substituent group A;

$Y^{1'}$ is a single bond,

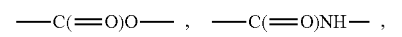

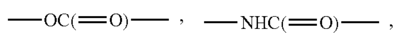

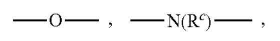

phenylene, or carbazolylene;

$R^e$ is an organic group; and $Y^{2'}$ is a single bond or a linker having 1 to 16 atoms in a main chain thereof.

29. The curable composition according to claim 26, wherein the functional group selected from the substituent group A is an epoxy group, a glycidyl group, an alicyclic epoxy group, or $CH_2{=}CX^{1'}—C(O)—$, wherein $X^{1'}$ represents a hydrogen atom, a chlorine atom, a fluorine atom, or an alkyl group having 1 to 10 carbon atoms optionally substituted with fluorine.

30. The curable composition according to claim 26, wherein n' is an integer of 2 to 50.

31. The curable composition according to claim 26, wherein n' is an integer of 3 to 30.

32. The curable composition according to claim 1, wherein the fluoropolyether group-containing compound is a fluoropolyether group-containing compound represented by the following formula (5):

(5)

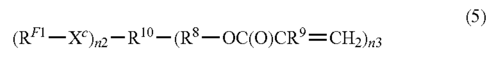

wherein $R^{F1}$ is $Rf^1—R^F—O_q—$;

$Rf^1$ is a $C_{1-16}$ alkyl group optionally substituted with one or more fluorine atoms;

$R^F$ is each independently a divalent fluoropolyether group;

q is 0 or 1;

$X^e$ is a group represented by the following formula:

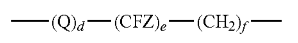

wherein Q represents an oxygen atom, phenylene, carbazolylene, —$NR^a$—, wherein $R^a$ represents a hydrogen atom or an organic group, or a divalent polar group;

Z represents a hydrogen atom, a fluorine atom, or a lower fluoroalkyl group; and d, e, and f are each independently an integer of 0 to 50, the sum of d, e, and f is at least 1, and the occurrence order of the respective repeating units enclosed in parentheses is not limited in the formula;

$R^{10}$ represents an organic group having a valence of (n2+n3) that optionally has a ring structure, a heteroatom, and/or a functional group;

$R^8$ represents a divalent organic group;

$R^9$ represents a hydrogen atom, a chlorine atom, a fluorine atom, or an alkyl group having 1 to 10 carbon atoms optionally substituted with fluorine;

n2 is an integer of 1 to 3; and n3 is an integer of 1 to 3.

33. The curable composition according to claim 26, wherein $R^F$ is each independently a group represented by the formula:

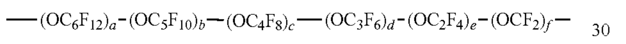

wherein $R^{Fa}$ is each independently at each occurrence a hydrogen atom, a fluorine atom, or a chlorine atom; and a, b, c, d, e, and f are each independently an integer of 0 to 200, the sum of a, b, c, d, e, and f is 1 or more, and the occurrence order of the respective repeating units enclosed in parentheses provided with a, b, c, d, e, or f is not limited in the formula.

34. The curable composition according to claim 33, wherein $R^{Fa}$ is a fluorine atom.

35. The curable composition according to claim 26, wherein RF is each independently a group represented by the following formula (f1), (f2), (f3), (f4), or (f5):

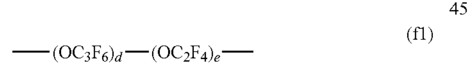

(f1)

wherein d is an integer of 1 to 200 and e is 0 or 1;

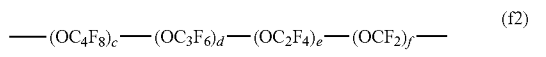

(f2)

wherein c and d are each independently an integer of 0 to 30;

e and f are each independently an integer of 1 to 200;

the sum of c, d, e, and f is an integer of 10 to 200; and the occurrence order of the respective repeating units enclosed in parentheses provided with the subscript c, d, e, or f is not limited in the formula;

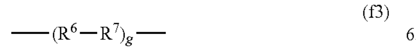

(f3)

wherein $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or is a combination of two or three groups selected from these groups; and g is an integer of 2 to 100;

(f4)

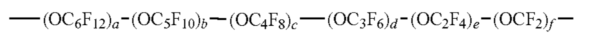

wherein e is an integer of 1 or more and 200 or less, a, b, c, d, and f are each independently an integer of 0 or more and 200 or less, the sum of a, b, c, d, e, and f is at least 1, and the occurrence order of the respective repeating units enclosed in parentheses provided with a, b, c, d, e, or f is not limited in the formula; or (f5)

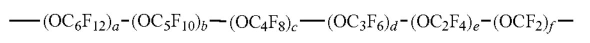

wherein f is an integer of 1 or more and 200 or less, a, b, c, d, and e are each independently an integer of 0 or more and 200 or less, the sum of a, b, c, d, e, and f is at least 1, and the occurrence order of the respective repeating units enclosed in parentheses provided with a, b, c, d, e, or f is not limited in the formula.

36. The curable composition according to claim 26, further comprising at least one fluorine-containing oil represented by the following general formula (C):

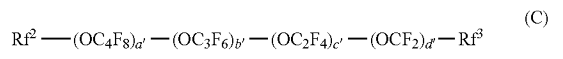

(C)

wherein $Rf^2$ is an alkyl group having 1 to 16 carbon atoms optionally substituted with one or more fluorine atoms;

$Rf^3$ is a hydrogen atom, a fluorine atom, or an alkyl group having 1 to 16 carbon atoms optionally substituted with one or more fluorine atoms;

in the above formula (C), a', b', c', and d' respectively represent the numbers of three repeating units of perfluoro (poly) ethers constituting the main backbone of the polymer and are each independently an integer of 0 or more and 300 or less;

the sum of a', b', c', and d' is at least 1; and the occurrence order of the respective repeating units enclosed in parentheses provided with the subscript a', b', c', or d' is not limited in the formula.

37. The curable composition according to claim 1, wherein the curable composition has a mass ratio between the silicone copolymer and the fluoropolyether group-containing compound in the range of 0.1:100 to 100:0.1.

38. The curable composition according to claim 1, wherein the curable composition has a mass ratio between the silicone copolymer and the fluoropolyether group-containing compound in the range of 0.5:100 to 100:100.

39. A film formed from the curable composition according to claim 1.

40. An article comprising a substrate and a layer on a surface of the substrate, wherein the layer is formed from the curable composition according to claim 1.

41. The article according to claim 40, which is an optical member.

42. The article according to claim 40, which is a LiDAR cover member.

43. The article according to claim 40, which is a sensor member.

44. The article according to claim 40, which is an instrument panel cover member.

45. The article according to claim 40, which is an automobile interior member.

* * * * *